United States Patent
Yumiki et al.

(10) Patent No.: US 7,986,469 B2
(45) Date of Patent: Jul. 26, 2011

(54) LENS BARREL AND IMAGING DEVICE

(75) Inventors: Naoto Yumiki, Osaka (JP); Hideo Onishi, Osaka (JP); Yoshiharu Araki, Osaka (JP); Fumio Muramatsu, Kyoto (JP); Masato Murayama, Osaka (JP)

(73) Assignee: Panasonic Corporation, Osaka (JP)

( * ) Notice: Subject to any disclaimer, the term of this patent is extended or adjusted under 35 U.S.C. 154(b) by 252 days.

(21) Appl. No.: 12/471,561

(22) Filed: May 26, 2009

(65) Prior Publication Data

US 2010/0046085 A1 Feb. 25, 2010

(30) Foreign Application Priority Data

Aug. 25, 2008 (JP) ................... 2008-215867
Aug. 25, 2008 (JP) ................... 2008-215868
Aug. 25, 2008 (JP) ................... 2008-215869

(51) Int. Cl.
*G02B 15/14* (2006.01)

(52) U.S. Cl. ........................ 359/694; 359/698

(58) Field of Classification Search .................. 359/694, 359/698
See application file for complete search history.

(56) References Cited

U.S. PATENT DOCUMENTS

| | | | | |
|---|---|---|---|---|
| 6,459,537 B2* | 10/2002 | Uno et al. | ...................... | 359/699 |
| 7,574,126 B2* | 8/2009 | Honjo et al. | ..................... | 396/97 |
| 2006/0083505 A1 | 4/2006 | Kashiwaba | | |

FOREIGN PATENT DOCUMENTS

| JP | 2005-215520 A | 8/2005 |
|---|---|---|
| JP | 2006-113289 A | 4/2006 |

* cited by examiner

*Primary Examiner* — Ricky L Mack
*Assistant Examiner* — James C Jones
(74) *Attorney, Agent, or Firm* — Panasonic Patent Center; Dhiren Odedra; Kerry Culpepper

(57) ABSTRACT

An interchangeable lens unit comprises a second lens group unit, a focus lens unit, a fourth lens group unit, a zoom ring unit, and a focus motor. The zoom ring unit mechanically transmits operational force inputted to a zoom ring to the second lens group unit and the fourth lens group unit. The focus motor electrically drives the focus lens unit in the Z axis direction with respect to the second lens group unit. When the zoom ring is operated in a state in which no power is being supplied to the focus motor, a gap is always ensured in the Z axis direction between the focus lens unit and the second lens group unit.

21 Claims, 23 Drawing Sheets

LENS BARREL AND IMAGING DEVICE

CROSS-REFERENCE TO RELATED APPLICATIONS

This application claims priority to Japanese Patent Applications No. 2008-215867 filed on Aug. 25, 2008, No. 2008-215868 filed on Aug. 25, 2008, and No. 2008-215869 filed on Aug. 25, 2008. The entire disclosure of Japanese Patent Applications No. 2008-215867, No. 2008-215868, and No. 2008-215869 are hereby incorporated herein by reference.

BACKGROUND

1. Technical Field

The technical field relates to a lens barrel with which the focal length can be changed.

2. Description of the Related Art

Conventional digital cameras make use of a zoom lens system with which the focal length can be varied while the object distance of a subject that is in focus (hereinafter also referred to as the subject distance) is kept substantially constant. For example, zoom lens systems are employed in compact digital cameras and digital cameras with interchangeable lenses.

With a conventional lens barrel, for example, as the zoom mechanism operates, the focus lens unit including the focus lens is moved in the optical axis direction by a cam mechanism. This allows the focal length to be varied while the subject distance is kept substantially constant (see, for example, Japanese Laid-Open Patent Application 2006-113289).

A phase difference detection system has been employed as the auto-focus system with conventional interchangeable lens digital cameras.

More recently, however, an interchangeable lens digital camera has been proposed that makes use of a contrast detection system for auto-focusing. With this contrast detection system, for example, the focus lens unit is moved in the optical axis direction while evaluation values at various positions of the focus lens unit are found on the basis of image data. The focus lens unit is moved until the evaluation value goes past its peak, after which the evaluation value is returned to its maximum position to focus the subject image (an optical image of the subject). Thus, in auto-focusing by contrast detection, it is necessary to move the focus lens unit back and forth in the optical axis direction.

Also, since the focus needs to be continued during the capture of moving pictures, the focus lens unit has to be continuously moved back and forth and the peak of the evaluation value detected.

Thus, when a contrast detection system is used, since the focus lens unit is moved in the optical axis direction, making the focus lens unit smaller is preferable when drive speed is taken into account.

However, when a configuration is employed in which the focus lens unit is driven in the optical axis direction by a cam mechanism, as with the lens barrel described in Japanese Laid-Open Patent Application 2006-113289, the focus lens unit ends up being larger or heavier.

In view of this, the inventors of the present application studied a lens barrel with which drive of the zoom mechanism was only performed during manual operation by the user, and drive of the focus lens unit with respect to the zoom mechanism was performed only by actuator. In this case, because the structure of the focus lens unit and its surrounding components is simplified, the focus lens unit can be smaller.

However, since the focus lens unit is driven only by actuator, if the zoom mechanism is manually operated by the user in a state in which no power is supplied to the interchangeable lens unit, depending on where the focus lens unit has stopped, there is the risk that the focus lens unit may come into contact with a lens group driven by the zoom mechanism, or with a lens support frame.

SUMMARY

It is an object to provide a lens barrel and an imaging device with which damage to the members can be prevented.

The lens barrel according to one aspect is a lens barrel for forming an optical image of a subject on an imaging element, comprising a first lens unit, a second lens unit, a focus lens unit, a zoom mechanism, and a focus actuator. The first lens unit has a first lens element and a first lens support frame supporting the first lens element. The second lens unit has a second lens element arranged to vary the focal length by moving relative to the first lens element in the optical axis direction, and a second lens support frame supporting the second lens element. The focus lens unit has a focus lens arranged to vary the focal state of the optical image by moving relative to the first lens element or the second lens element in the optical axis direction, and a focus lens support frame supporting the focus lens. The zoom mechanism relatively moves the first lens unit and the second lens unit in the optical axis direction, and has a zoom operating unit that is operated by the user. The zoom mechanism mechanically transmits the operating force inputted to the zoom operating unit to at least one of the first lens unit and the second lens unit. The focus actuator is supported by the zoom mechanism to move integrally with the first lens unit, and is configured to utilize electric power to drive the focus lens unit in the optical axis direction with respect to the first lens unit. The focus lens unit is driven in the optical axis direction with respect to the first lens unit by just the focus actuator. When the zoom operating unit is operated in a state in which no power is being supplied to the focus actuator, a gap is always maintained in the optical axis direction between the focus lens unit and the second lens unit.

With this lens barrel, since the focus lens unit is driven in the optical axis direction with respect to the first lens unit by just the focus actuator, the focus lens unit does not move in the optical axis direction with respect to the first lens unit in a state in which no power is supplied to the focus actuator. Therefore, when the user operates the zoom operating unit in a state in which no power is supplied to the focus actuator, the focus lens unit is driven by the zoom mechanism in the optical axis direction integrally with the first lens unit, without moving relative to the first lens unit. At this point, since a gap is always maintained between the focus lens unit and the second lens unit, even in a state in which no power is supplied, the focus lens unit can be prevented from coming into contact with the second lens unit. Consequently, damage to the members can be prevented with this lens barrel and with an imaging device in which this lens barrel is installed.

The lens barrel according to another aspect is a lens barrel for forming an optical image of a subject on an imaging element, with which power can be supplied from a main power supply, said lens barrel comprising a first lens unit, a second lens unit, a focus lens unit, a zoom mechanism, a focus actuator, and an auxiliary power supply. The first lens unit has a first lens element and a first lens support frame supporting the first lens element. The second lens unit has a second lens element arranged to vary the focal length by moving relative to the first lens element in the optical axis direction, and a second lens support frame supporting the second lens element. The focus lens unit has a focus lens arranged to vary the focal state of the optical image by moving relative to the first lens element or the second lens element in the optical axis direction, and a focus lens support frame supporting the focus lens. The zoom mechanism relatively moves the first lens unit and the second lens unit in the optical axis direction, and has a zoom operating unit that is operated by the user, with which the operating force inputted to the zoom operating unit is mechanically transmitted to at least one of the first lens unit and the second lens unit. The focus actuator is supported by the zoom mechanism to move integrally with the first lens unit, and is configured to utilize electric power to drive the focus lens unit in the optical axis direction with respect to the first lens unit. The auxiliary power supply can supply power to the focus actuator if the supply of power from the main power supply to the focus actuator should be halted.

With this lens barrel, in the event that the supply of power from the main power supply to the focus actuator should be halted, power will be supplied from the auxiliary power supply to the focus actuator, so the focus lens unit can be driven by the focus actuator until it reaches a position where it will not come into contact with the second lens unit. As a result, even if the zoom operating unit is operated in a state in which the supply of power from the main power supply is halted, the focus lens unit can be prevented from coming into contact with the second lens unit. Consequently, damage to the members can be prevented with this lens barrel and with an imaging device in which this lens barrel is installed.

The imaging device according to still another aspect is an imaging device for acquiring an image of a subject, comprising an interchangeable lens unit and a camera body. The interchangeable lens unit has a first lens unit, a second lens unit, a focus lens unit, a zoom mechanism, and a focus actuator. The first lens unit has a first lens element and a first lens support frame supporting the first lens element. The second lens unit has a second lens element arranged to vary the focal length by moving relative to the first lens element in the optical axis direction, and a second lens support frame supporting the second lens element. The focus lens unit has a focus lens arranged to vary the focal state of the optical image by moving relative to the first lens element or the second lens element in the optical axis direction, and a focus lens support frame supporting the focus lens. The zoom mechanism relatively moves the first lens unit and the second lens unit in the optical axis direction, has a zoom operating unit that is operated by the user, and mechanically transmits the operating force inputted to the zoom operating unit to at least one of the first lens unit and the second lens unit. The focus actuator is supported by the zoom mechanism to move integrally with the first lens unit, and is configured to utilize electric power to drive the focus lens unit in the optical axis direction with respect to the first lens unit. The camera body has an auxiliary operation detector and a drive controller. The auxiliary operation detector detects auxiliary operation in which the halt of power supply to the focus actuator can be expected. The drive controller controls the focus actuator so that the focus lens unit moves to a retracted position where the focus lens unit does not come into contact with the second lens unit, on the basis of the detection result of the auxiliary operation detector.

With this imaging device, auxiliary operation in which the halt of power supply to the focus actuator can be expected is detected by the auxiliary operation detector. On the basis of this detection result, the focus actuator is controlled by the drive controller so that the focus lens unit moves to its retracted position where it will not come into contact with the second lens unit. Therefore, the focus lens unit can be driven to its retracted position before the supply of power to the focus actuator is halted, and even if the zoom operating unit is operated in a state in which no power is supplied to the focus actuator, the focus lens can be prevented from coming into contact with the second lens. Consequently, damage to the members can be prevented with this imaging device.

Examples of the auxiliary operation here include opening of the battery cover, and switching to idle mode, such as sleep mode, or reproduction mode. Also, in the case of interchangeable lens type of imaging device, it is possible that the auxiliary operation will be pressing a lens attachment button, for example.

The lens barrel here also encompasses an interchangeable lens unit that is used in an interchangeable lens type of imaging device, in addition to a lens barrel that is integrated with a camera body. The imaging device also encompasses an interchangeable lens type of imaging device, in addition to an imaging device in which the camera body and the lens barrel are integrated. Examples of possible imaging devices include digital still cameras, interchangeable lens digital cameras, digital video cameras, portable telephones with a camera function, and PDAs (Personal Digital Assistants) with a camera function. The imaging device encompasses devices capable of capturing only still pictures, devices capable of capturing only moving pictures, and devices capable of capturing still pictures and moving pictures.

The first lens element, the second lens element, and the focus lens may each be made up of a plurality of lenses. Also, a state in which "the focus actuator moves integrally with the first lens unit" encompasses a state in which the focus actuator moves with respect to the first lens unit while moving integrally overall.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

First Embodiment

Summary of Digital Camera

Figure 1:
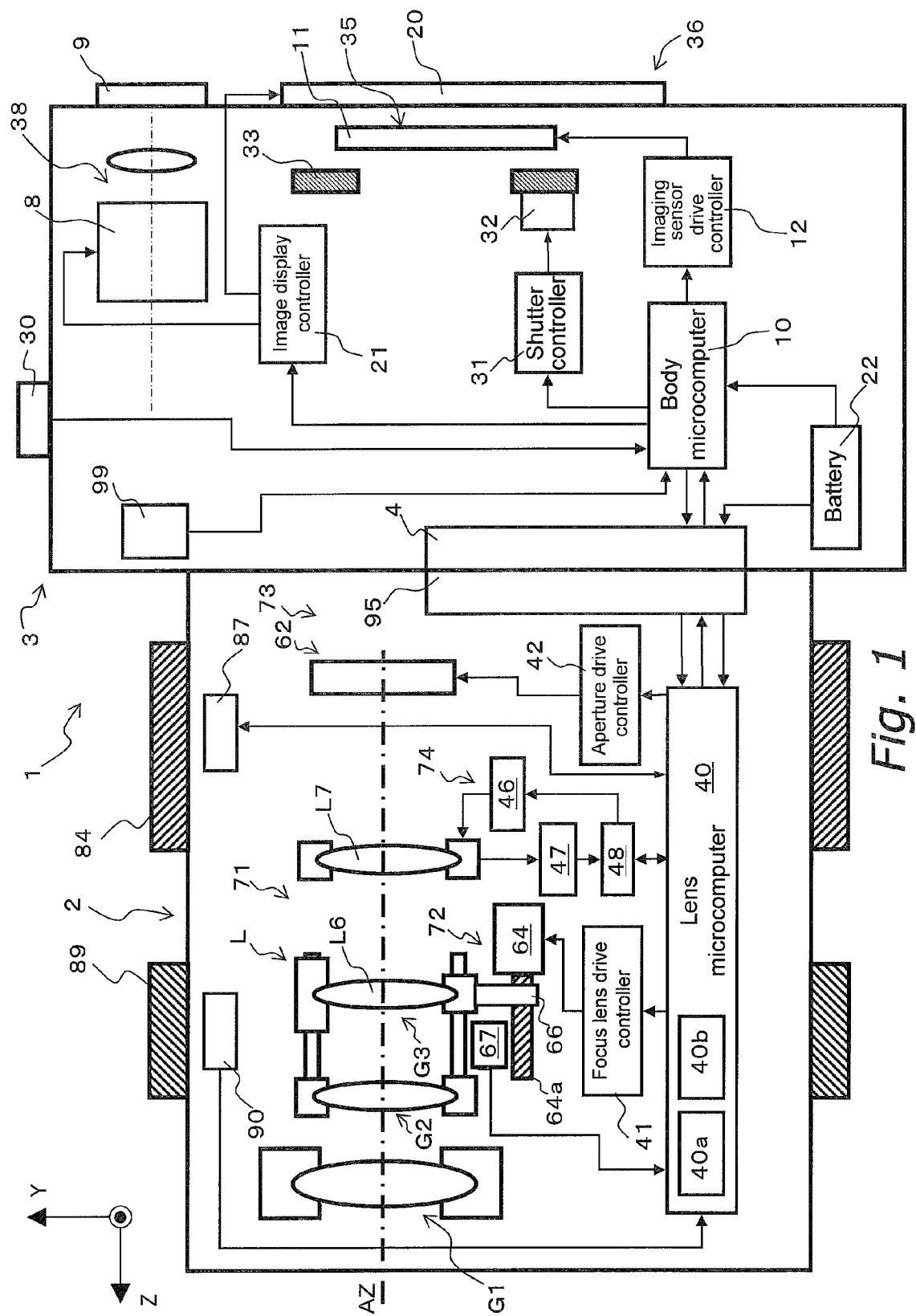
FIG. 1 is a simplified diagram of a digital camera.

A digital camera 1 will be described through reference to FIGS. 1 to 13. FIG. 1 is a simplified diagram of the digital camera 1. As shown in FIG. 1, the digital camera 1 (an example of the imaging device) is a digital camera with an interchangeable lens, and mainly comprises a camera body 3 and an interchangeable lens unit 2 (an example of the lens barrel) that is removably mounted to the camera body 3. The interchangeable lens unit 2 is mounted via a lens mount 95 to a body mount 4 provided to the front face of the camera body 3.

Figure 2:
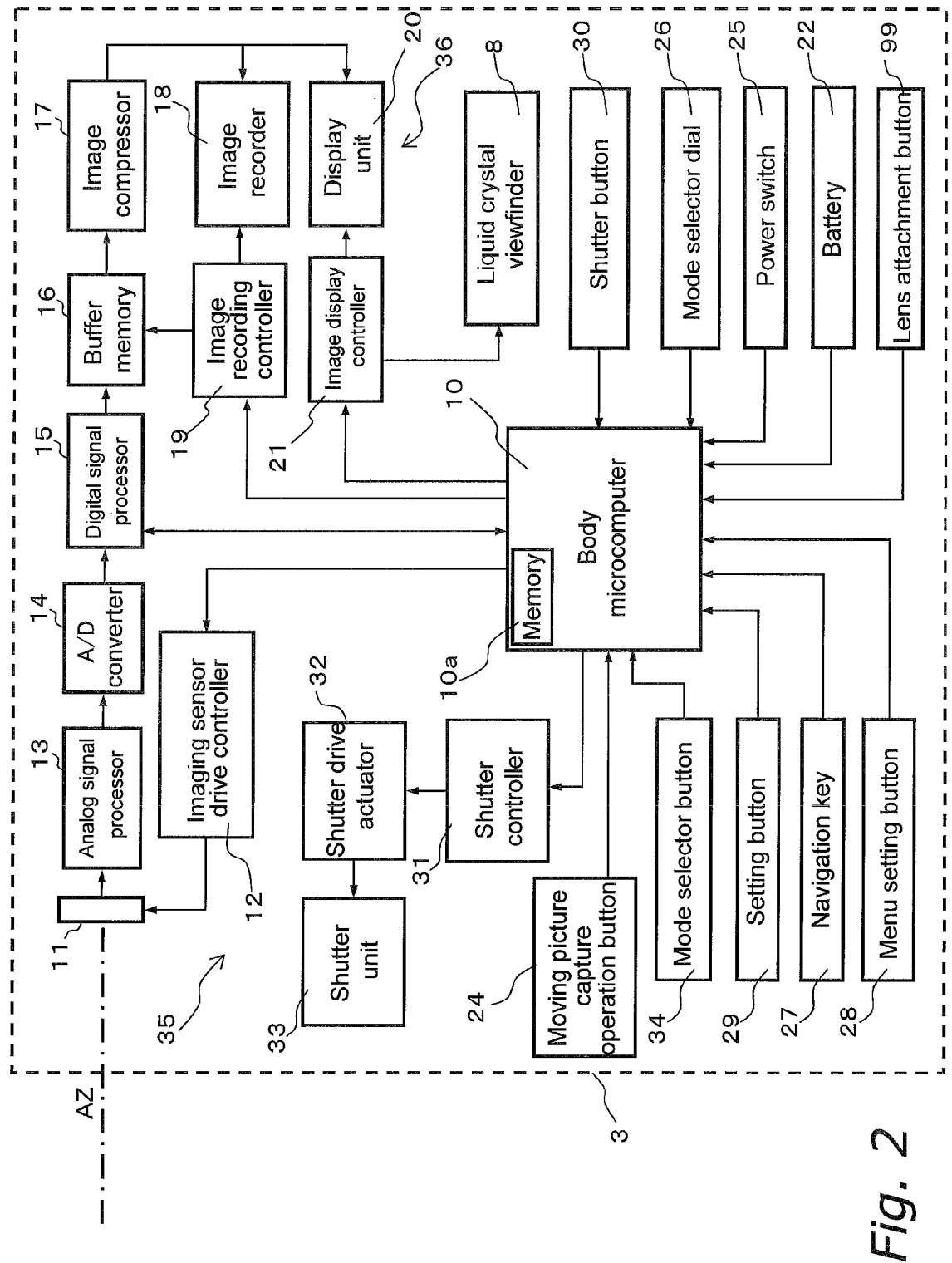
FIG. 2 is a block diagram of the configuration of a camera body.
Figure 3:
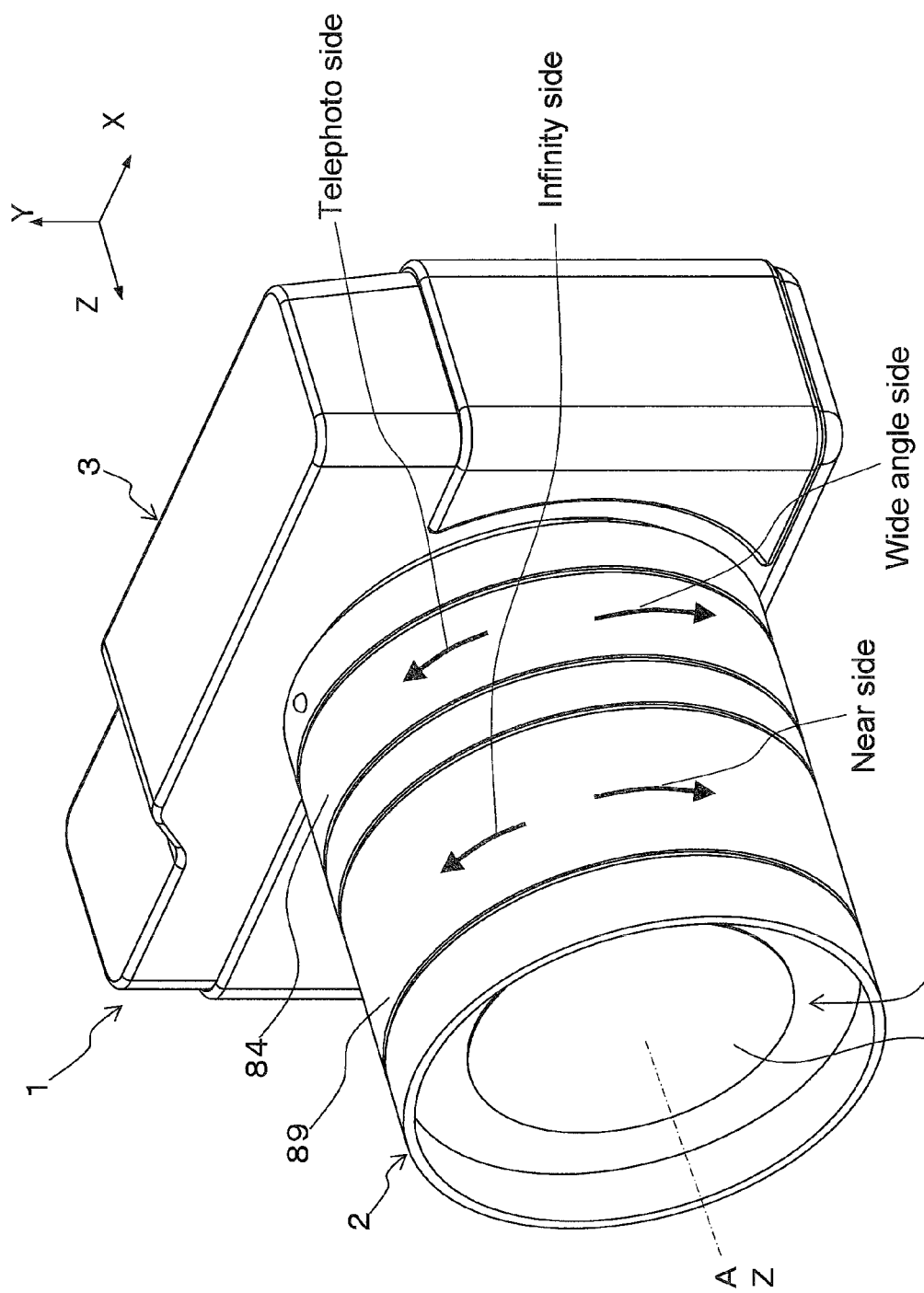
FIG. 3 is a simplified oblique view of a digital camera.
Figure 4A:
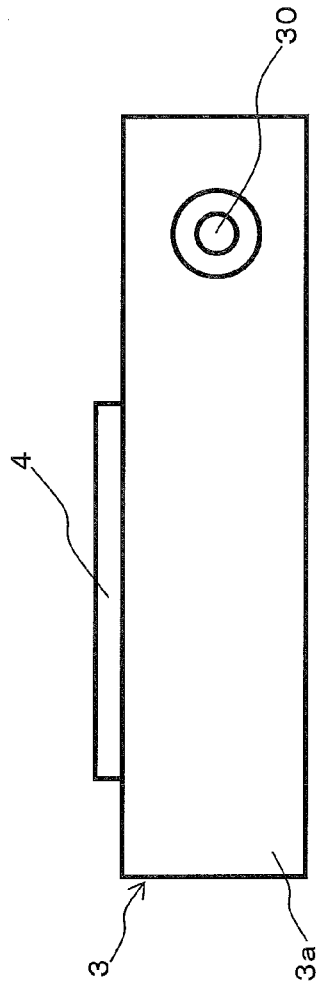
FIG. 4A is a top view of a camera body.
Figure 4B:
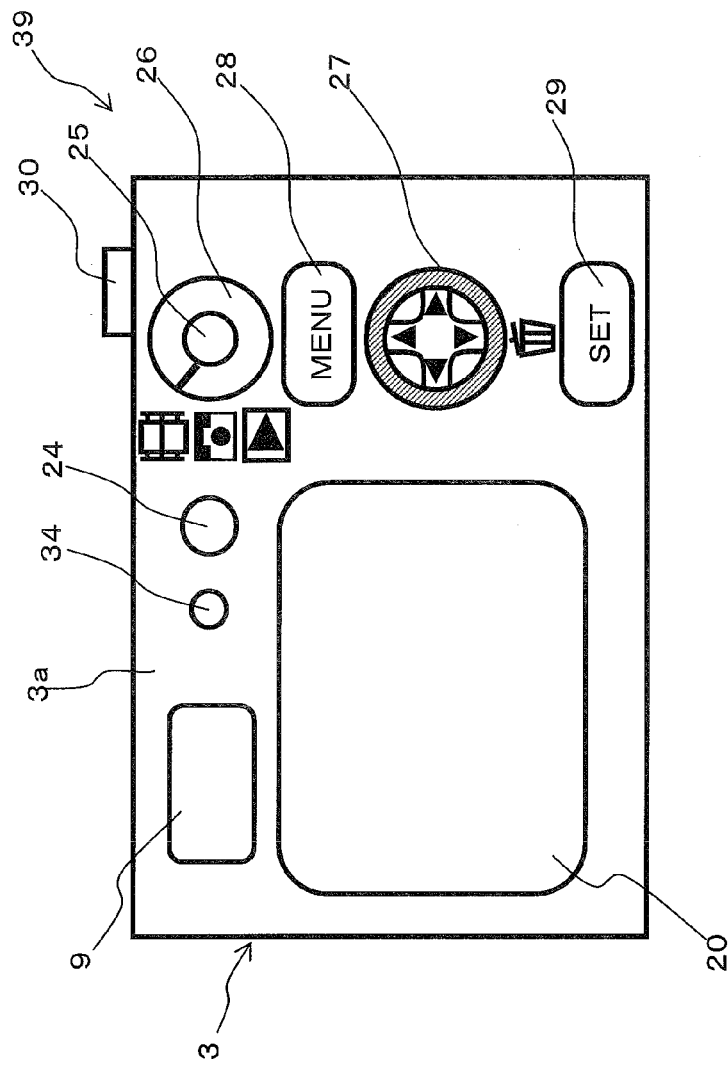
FIG. 4B is a rear view of a camera body.
Figure 5:
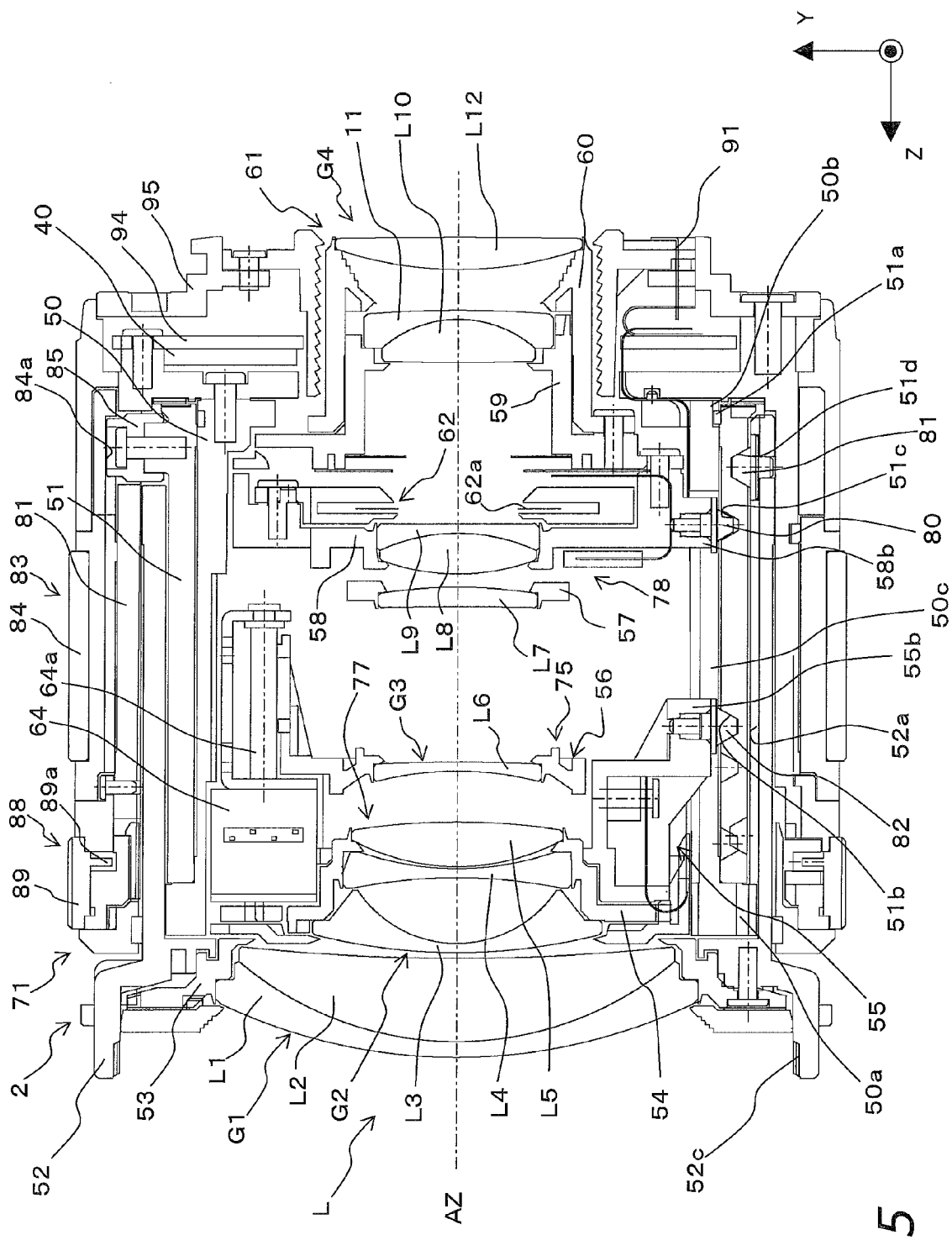
FIG. 5 is a cross section of an interchangeable lens unit (wide angle end)
Figure 6:
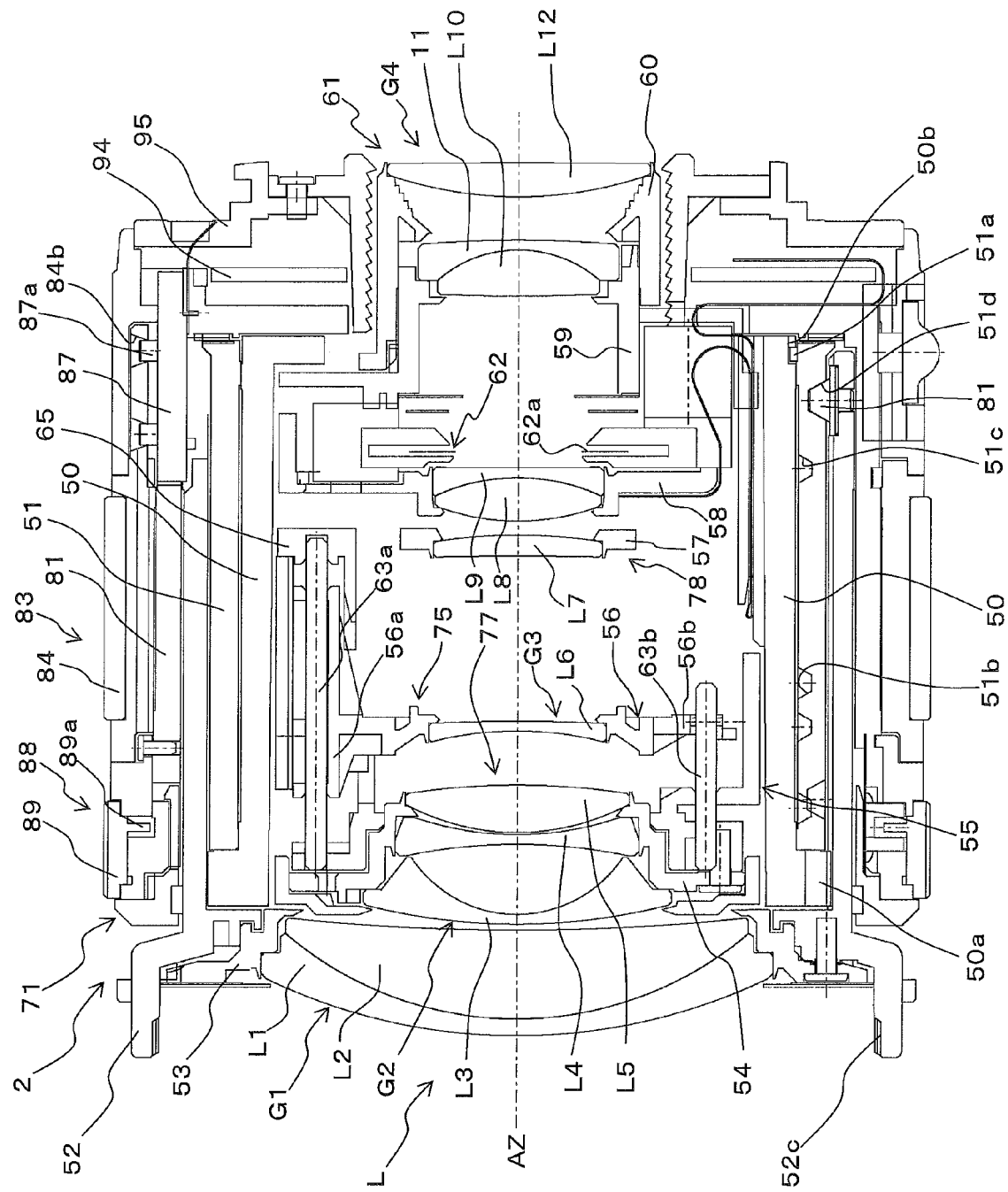
FIG. 6 is a cross section of an interchangeable lens unit (wide angle end)
Figure 7:
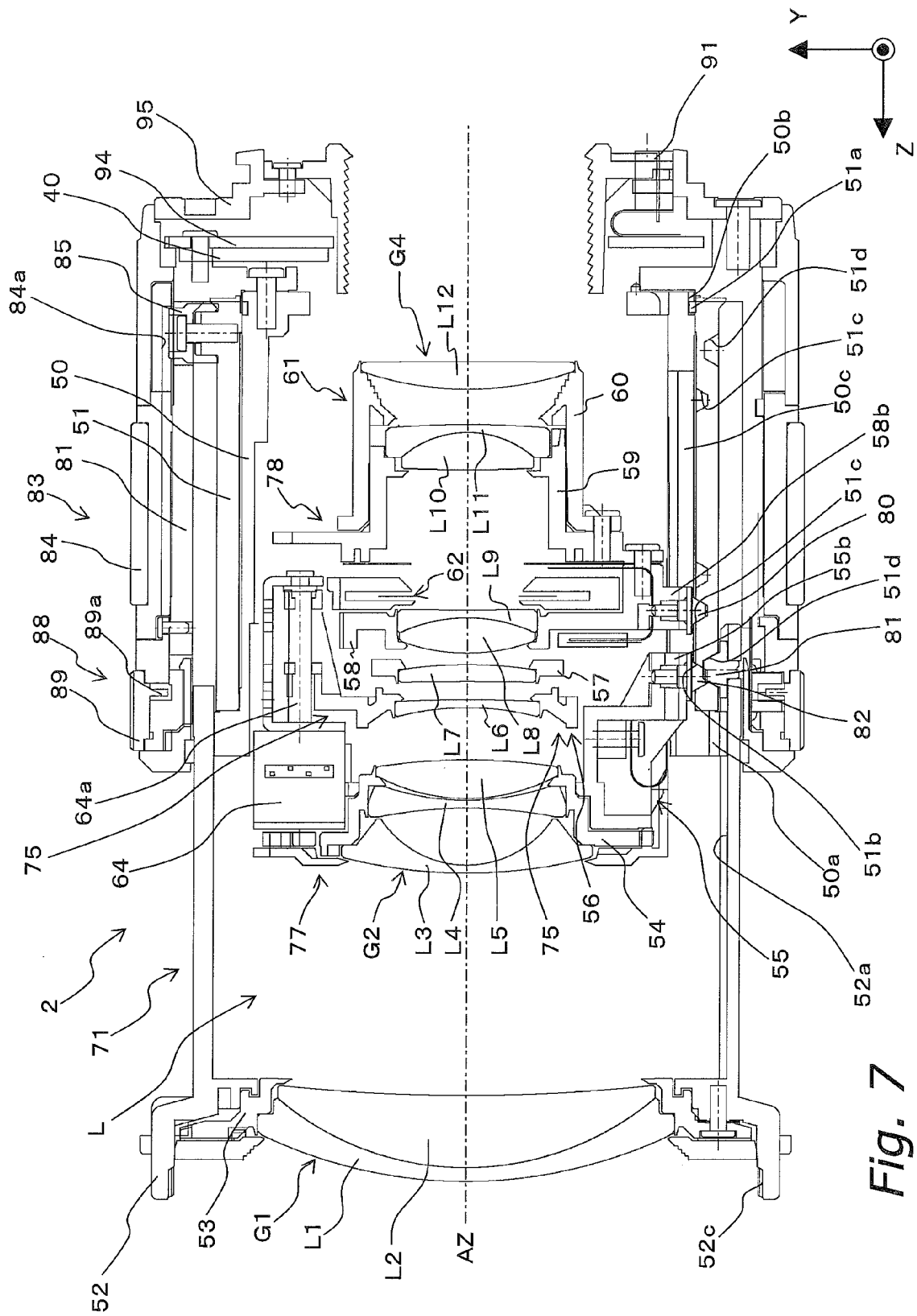
FIG. 7 is a cross section of an interchangeable lens unit (telephoto end)
Figure 8:
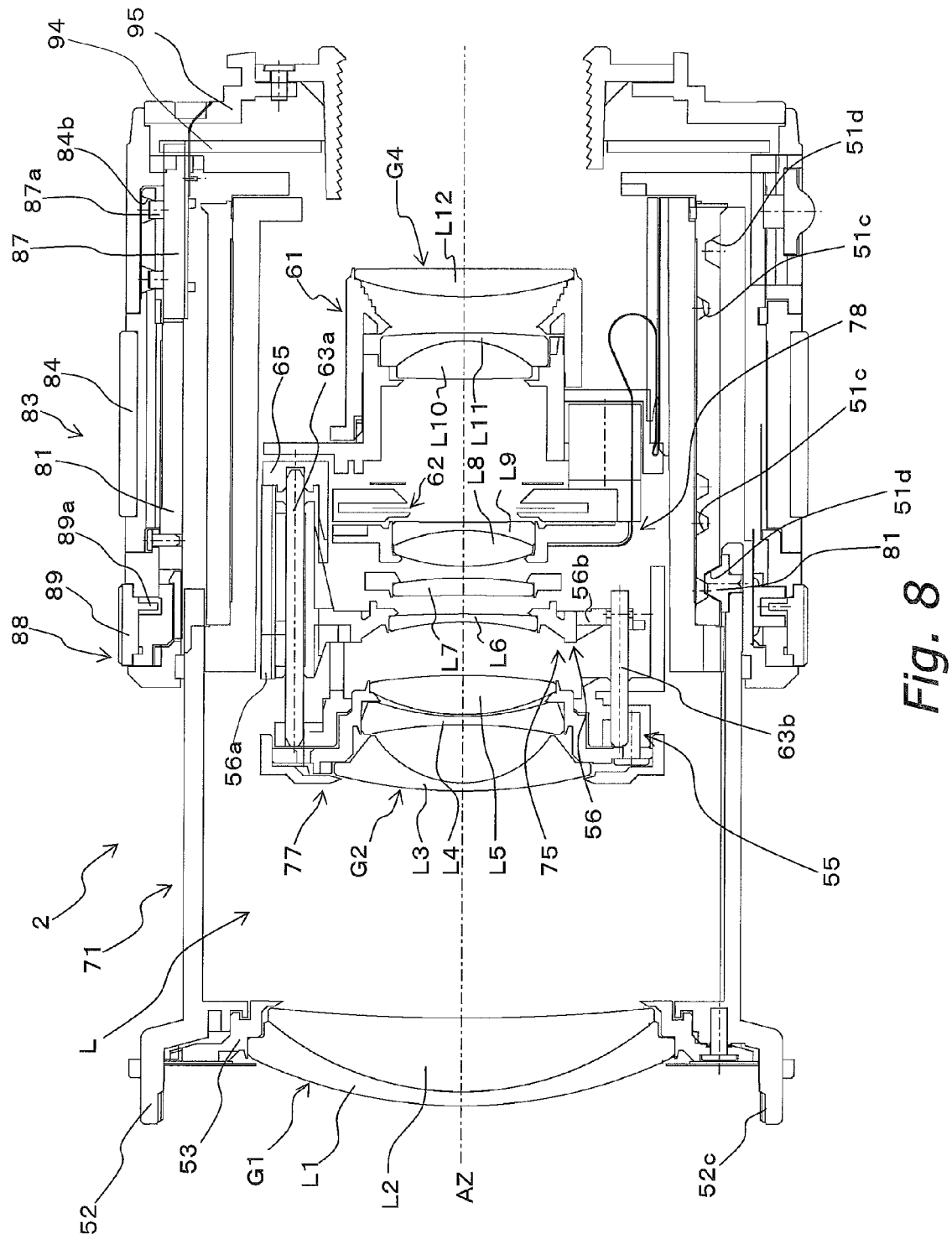
FIG. 8 is a cross section of an interchangeable lens unit (telephoto end)
Figure 9:
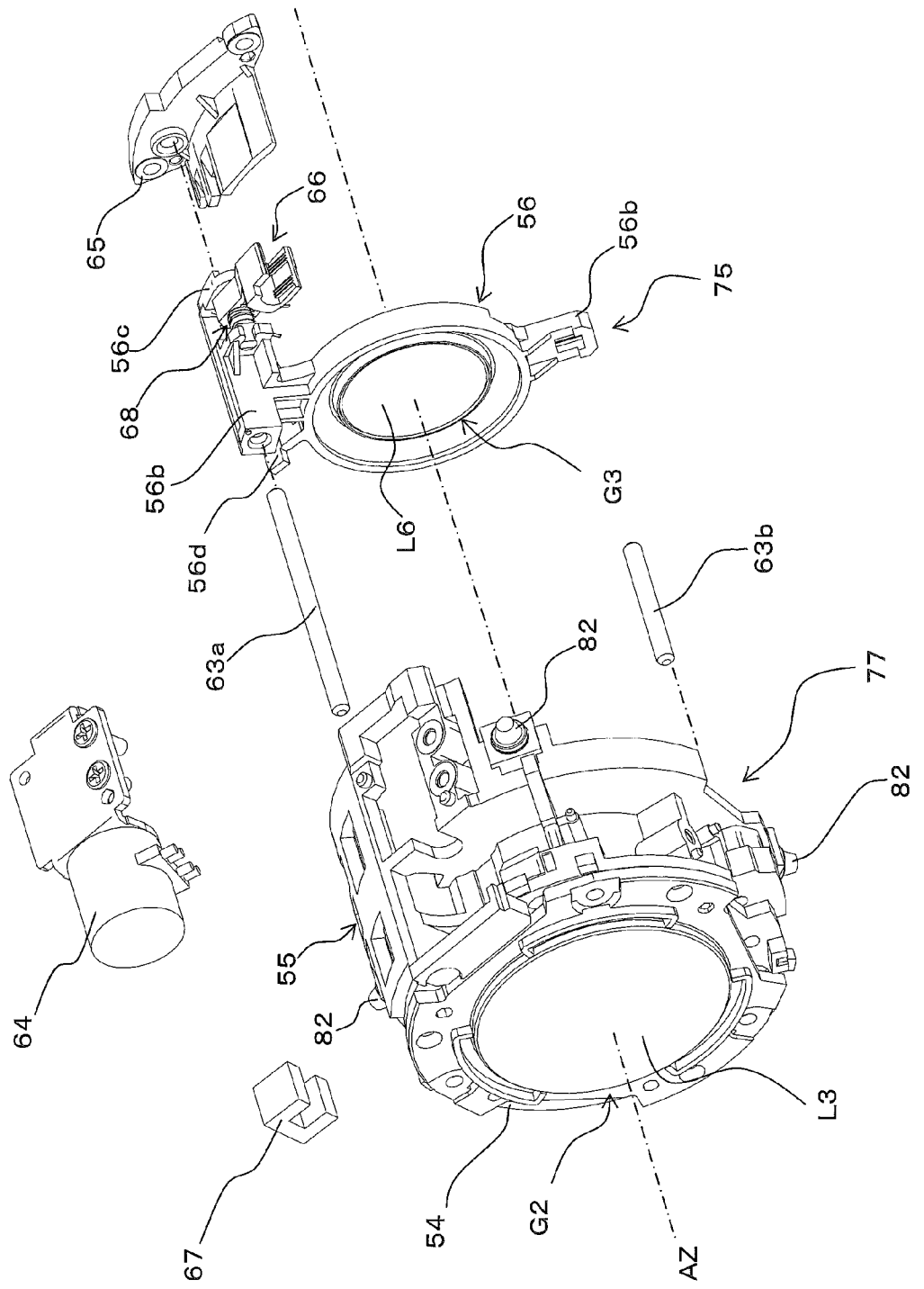
FIG. 9 is an exploded oblique view of a second lens group unit and a focus lens unit.
Figure 10:
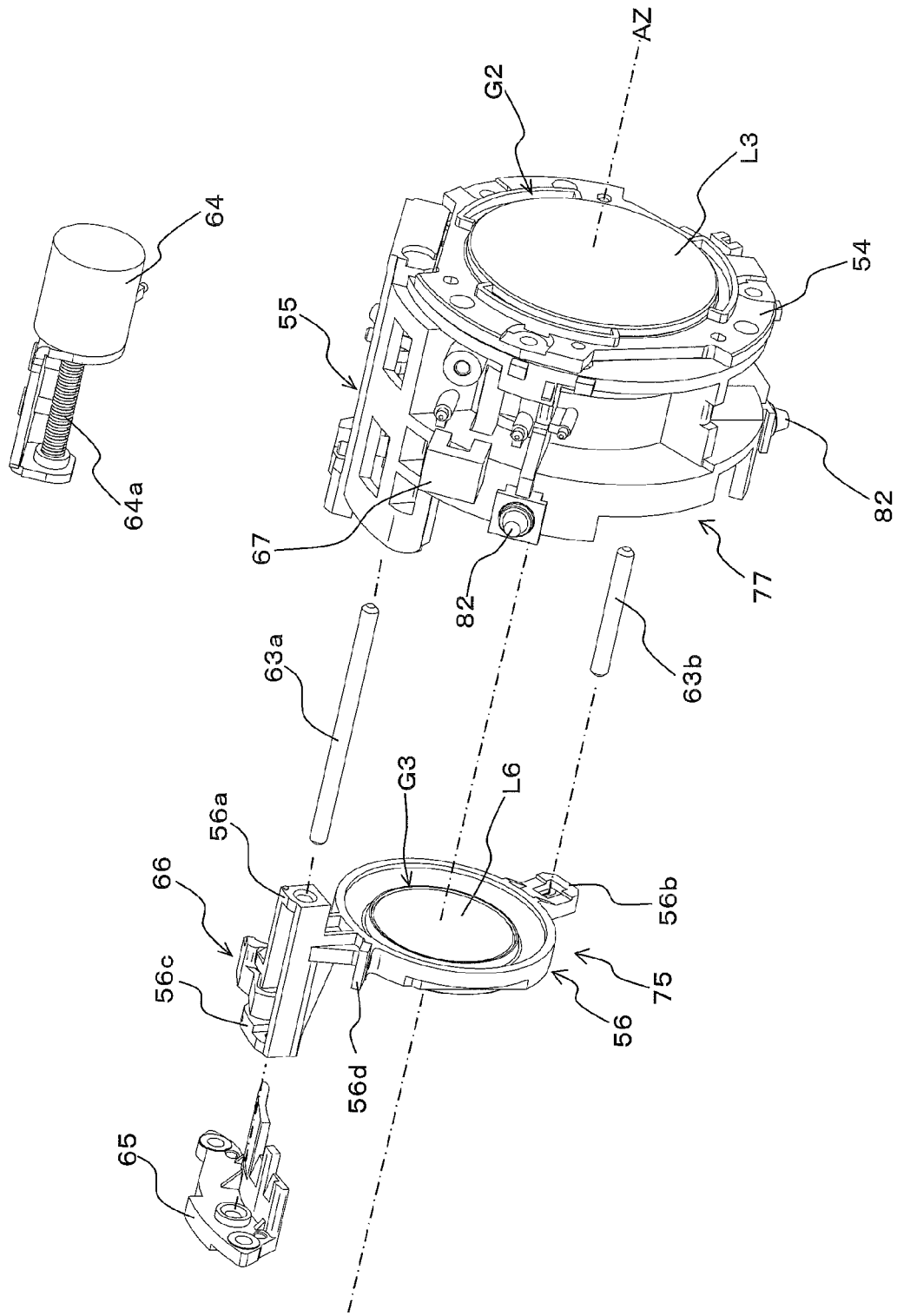
FIG. 10 is an exploded oblique view of a second lens group unit and a focus lens unit.
Figure 13:
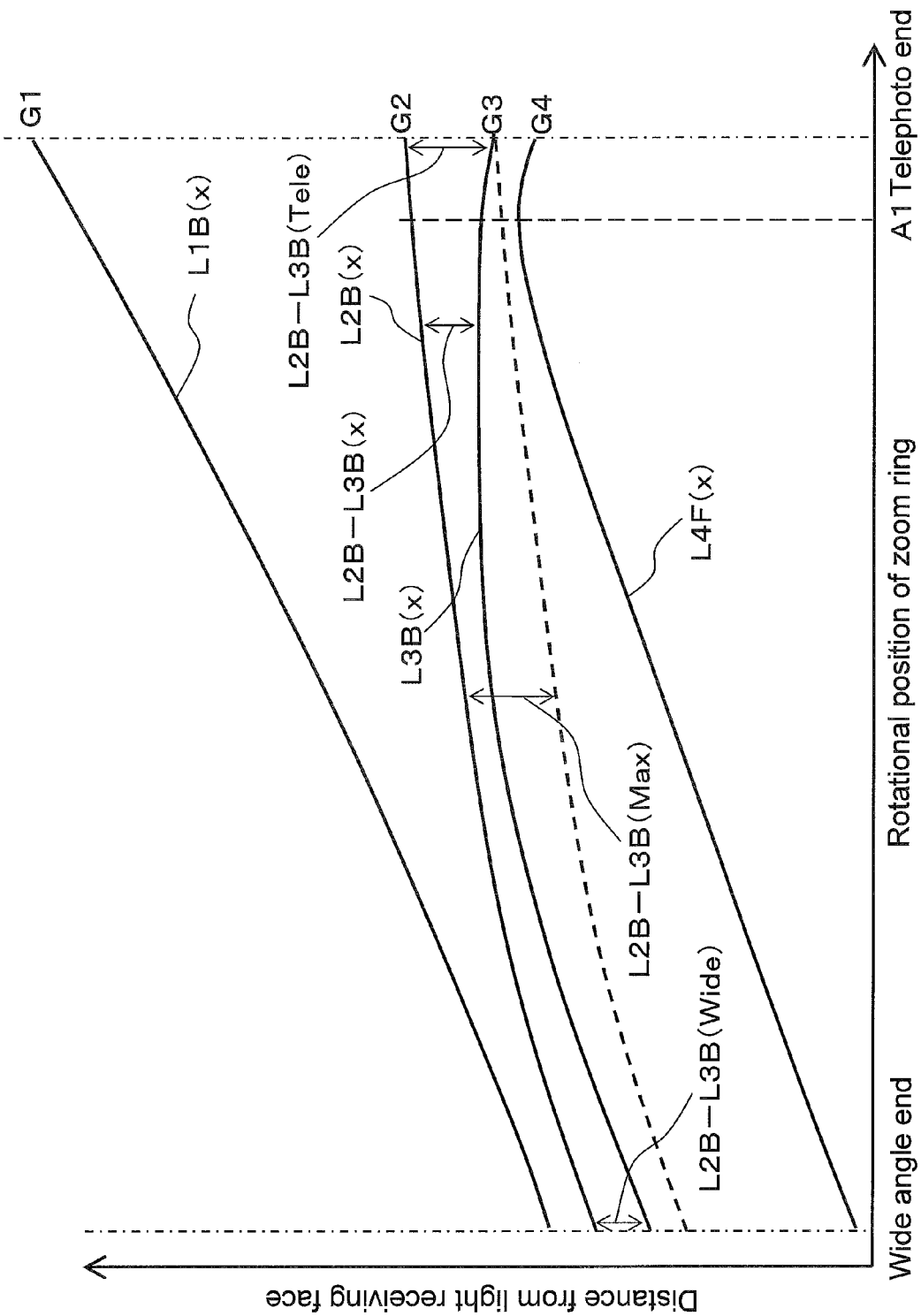
FIG. 13 is a graph of the relationship between the rotational angle of a zoom ring and the distance of the various members from an imaging sensor.

FIG. 2 is a block diagram of the configuration of the camera body 3. FIG. 3 is a simplified oblique view of the digital camera 1. FIG. 4A is a top view of the camera body 3, and FIG. 4B is a rear view of the camera body 3. FIGS. 5 to 8 are simplified cross sections of the interchangeable lens unit 2. FIGS. 5 and 6 show the state at the wide angle end, and FIGS. 7 and 8 show the state at the telephoto end. FIG. 6 is a cross section in a different plane from that of FIG. 5. FIG. 8 is a cross section in a different plane from that of FIG. 7. FIGS. 9 and 10 are exploded oblique views of a second lens group unit 77 and a focus lens unit 75. FIGS. 12A and 12B are diagrams of the configuration of an optical system L. FIG. 12A shows the state at the wide angle end, and FIG. 12B shows the state at the telephoto end. FIG. 13 is a graph of the relationship between the rotational position of a zoom ring 84 and the distance of the various members from an imaging sensor 11.

In this embodiment, a three-dimensionally perpendicular coordinate system is set with respect to the digital camera 1. The optical axis AZ of the optical system L (discussed below) coincides with the Z axis direction (an example of the optical axis direction). The X axis direction coincides with the horizontal direction when the digital camera 1 is in its portrait orientation, and the Y axis direction coincides with the vertical direction when the digital camera 1 is in its landscape orientation. In the following description, "front" means on the subject side of the digital camera 1 (the Z axis positive direction side), and "rear" means the opposite side from the subject side of the digital camera 1 (the user side, or the Z axis direction negative side).

Interchangeable Lens Unit

The basic configuration of the interchangeable lens unit 2 will be described through reference to FIGS. 1 to 12B. As shown in FIG. 1, the interchangeable lens unit 2 has the optical system L, a lens support mechanism 71 that supports the optical system L, a focus adjusting unit 72, an aperture adjusting unit 73, a blur correction unit 74, and a lens microcomputer 40 (an example of the drive controller).

(1) Optical System

The optical system L is a zoom lens system for forming an optical image of a subject, and is mainly made up of four lens groups. More specifically, as shown in FIGS. 12A and 12B, the optical system L has a first lens group G1 having a positive refractive power, a second lens group G2 having a negative refractive power, a third lens group G3 having a negative refractive power, and a fourth lens group G4 having a positive refractive power.

The first lens group G1 has a first lens L1 and a second lens L2 disposed on the imaging sensor 11 side of the first lens L1. The first lens L1 is a negative meniscus lens having a convex face that faces the subject side. The second lens L2 is a positive meniscus lens having a convex face that faces the subject side, and is joined to the first lens L1 via an adhesive layer.

The second lens group G2 has a third lens L3, a fourth lens L4 disposed on the imaging sensor 11 side of the third lens L3, and a fifth lens L5 (an example of the first lens element) disposed on the imaging sensor 11 side of the fourth lens L4. The third lens L3 is a negative meniscus lens having a convex face that faces the subject side. The fourth lens L4 is a biconcave lens. The fifth lens L5 is a biconvex lens.

The third lens group G3 is made up of a sixth lens L6 (an example of the focus lens). The sixth lens L6 is a negative meniscus lens having a convex face that faces the imaging sensor 11 side, and is disposed in the Z axis direction between the fifth lens L5 and a seventh lens L7 (in the Z axis direction between the second lens group G2 and the fourth lens group G4).

The fourth lens group G4 has the seventh lens L7 (an example of the second lens element), an eighth lens L8, a ninth lens L9, a tenth lens L10, an eleventh lens L11, and a twelfth lens L12. The seventh lens L7 is a positive meniscus lens for blur correction, and has a convex face that faces the imaging sensor 11 side. The eighth lens L8 is a biconvex lens. The ninth lens L9 is a biconcave lens, and is joined to the eighth lens L8 via an adhesive layer. The tenth lens L10 is a biconvex lens. The face of the tenth lens L10 on the subject side is aspherical. The eleventh lens L11 is a negative meniscus lens having a convex face that faces the subject side, and is joined to the tenth lens L10 via an adhesive layer. The twelfth lens L12 is a biconvex lens.

As shown in FIGS. 12A, 12B, and 13, when zooming in from the wide angle end to the telephoto end, the first lens group G1 to fourth lens group G4 each move in the Z axis direction along the optical axis AZ toward the subject side. More precisely, when zooming in from the wide angle end to the telephoto end, the space between the first lens group G1 and the second lens group G2 increases, the space between the second lens group G2 and the third lens group G3 increases, and the space between the third lens group G3 and the fourth lens group G4 decreases. An aperture unit 62 (discussed below) moves to the subject side along with the fourth lens group G4.

When focusing from an infinity focal state to a close focal state, the third lens group G3 moves along the optical axis AZ to the subject side.

Furthermore, the seventh lens L7 moves in two directions perpendicular to the optical axis AZ in order to suppress blurring in the optical image attributable to movement of the digital camera 1.

(2) Lens Support Mechanism

The lens support mechanism 71 is for movably supporting the optical system L, and has the lens mount 95, a fixed frame 50, a cam barrel 51, a first holder 52, a first lens group support frame 53, a second lens group support frame 54 (an example of the first lens support frame), a second holder 55 (an example of the first lens support frame), a third lens group support frame 56 (an example of the focus lens support frame), a fourth lens group support frame 61, a zoom ring unit 83 (an example of the zoom mechanism), and a focus ring unit 88.

The lens mount 95 is the portion of the camera body 3 that is mounted to the body mount 4, and has a lens-side contact 91. The fixed frame 50 is a member that rotatably supports the cam barrel 51, and is fixed to the lens mount 95. The fixed frame 50 has a protrusion 50a at the end on the Z axis direction positive side, three concave portions 50b provided to the outer periphery, and three linear through-grooves 50c disposed at an equal pitch around the optical axis AZ. The cam barrel 51 has three convex portions 51a provided to the inner periphery, three first cam grooves 51d, three second cam grooves 51b, and three third cam grooves 51c. Since the convex portions 51a of the cam barrel 51 are inserted into the concave portions 50b of the fixed frame 50, in a state in which relative movement is restricted in the Z axis direction, the cam barrel 51 is supported by the fixed frame 50 to be rotatable with respect to the fixed frame 50.

The first lens group support frame 53 is fixed to the first holder 52 and supports the first lens group G1. The first holder 52 has a longitudinal groove 52a that is formed on the inner peripheral side and extends in the Z axis direction, and three cam pins 81 that are disposed at a constant pitch around the optical axis AZ. The protrusion 50a of the fixed frame 50 is inserted in the longitudinal groove 52a. The cam pins 81 are inserted in the first cam grooves 51d of the cam barrel 51. This configuration allows the first holder 52 to move in the Z axis direction without rotating with respect to the fixed frame 50. The amount of movement of the first holder 52 with respect to the fixed frame 50 is determined by the shape of the first cam grooves 51d. Female threads 52c for attaching a conversion lens and an optical filter, such as a polarizing filter or a protective filter, are formed at the distal end of the first holder 52.

The second lens group support frame 54 is fixed to the second holder 55 and supports the second lens group G2. The second lens group support frame 54 and second holder 55 constitute the second lens group unit 77 (an example of the first lens unit). The second holder 55 has three convex portions 55b that are disposed at a constant pitch around the optical axis AZ, and three cam pins 82 that are fixed to the convex portions 55b. The cam pins 82 are inserted into the second cam grooves 51b. The convex portions 55b are inserted into the linear through-grooves 50c of the fixed frame 50. This configuration allows the second lens group support frame 54 and the second holder 55 to move in the Z axis direction without rotating with respect to the fixed frame 50. The amount of movement of the second lens group support frame 54 and the second holder 55 with respect to the fixed frame 50 is determined by the shape of the second cam grooves 51b.

The third lens group support frame 56 is a member that supports the third lens group G3 (more precisely, the sixth lens L6 that functions as a focus lens), and has a bearing part 56a, an anti-rotation part 56b, a rack support 56c, and a protrusion 56d. The sixth lens L6 and the third lens group support frame 56 constitute the focus lens unit 75. The second holder 55 supports the front ends of two guide poles 63a and 63b that extend in the Z axis direction. A guide pole support plate 65 is a member for supporting the rear end of the guide pole 63a, and is fixed on the imaging sensor 11 side of the second holder 55. The guide pole 63a is inserted into the bearing part 56a, and the guide pole 63b is inserted into the anti-rotation part 56b. The third lens group support frame 56 is supported movably in the Z axis direction by the guide poles 63a and 63b while being restricted in rotation around the optical axis AZ.

The rack support 56c is a member that extends from the bearing part 56a to the Z axis direction negative side, and supports a rack 66 rotatably and movably integrally in the axial direction. The rack 66 has a rack main body 66a having a plurality of teeth 66c, and a shaft 66b that extends in the Z axis direction. The plurality of teeth 66c mesh with a lead screw 64a of a focus motor 64. The shaft 66b is supported by the rack support 56c, so the rack 66 is able to rotate around the center axis R with respect to the rack support 56c.

Figure 11:
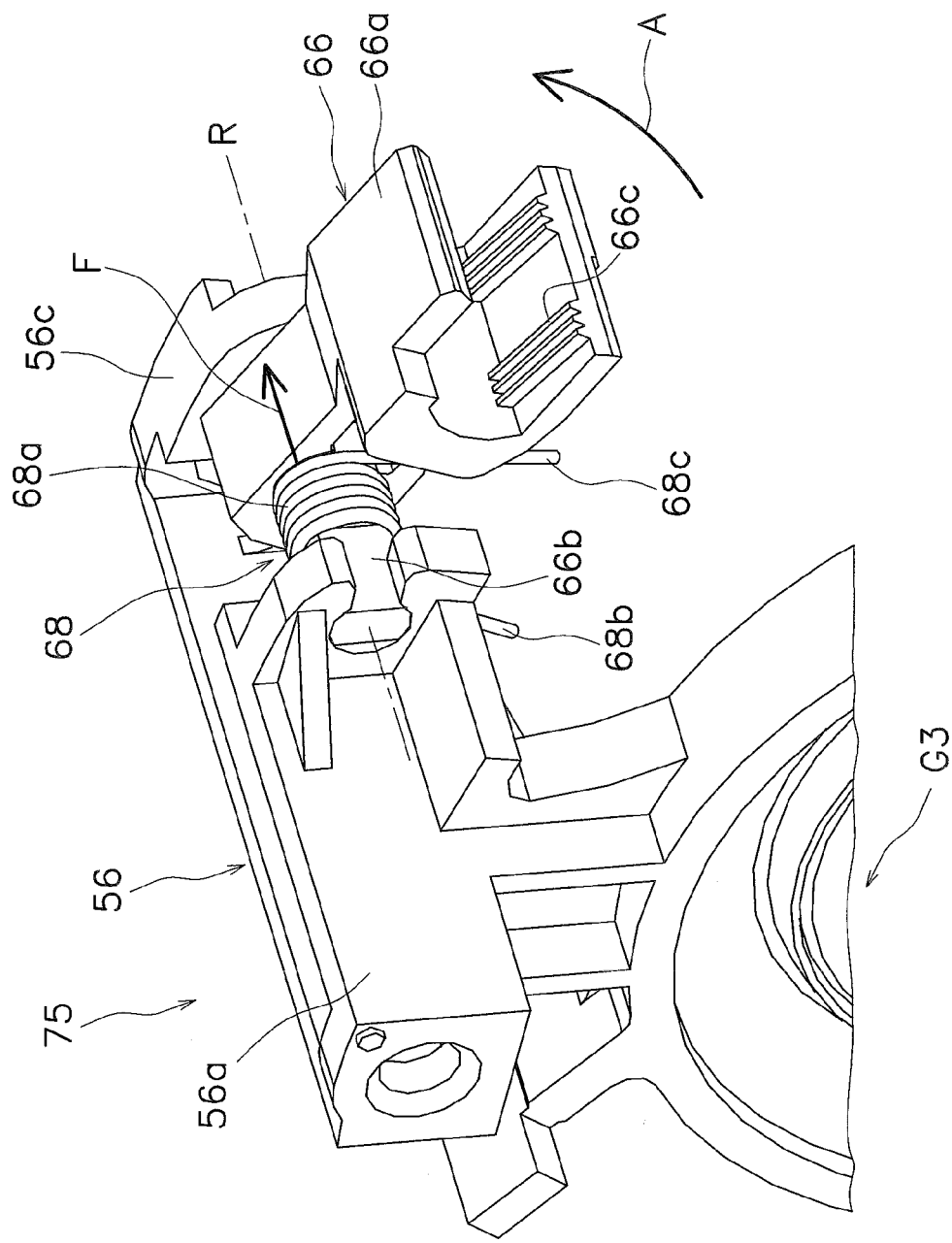
FIG. 11 is a partial oblique view of a focus lens unit.
Figure 12:
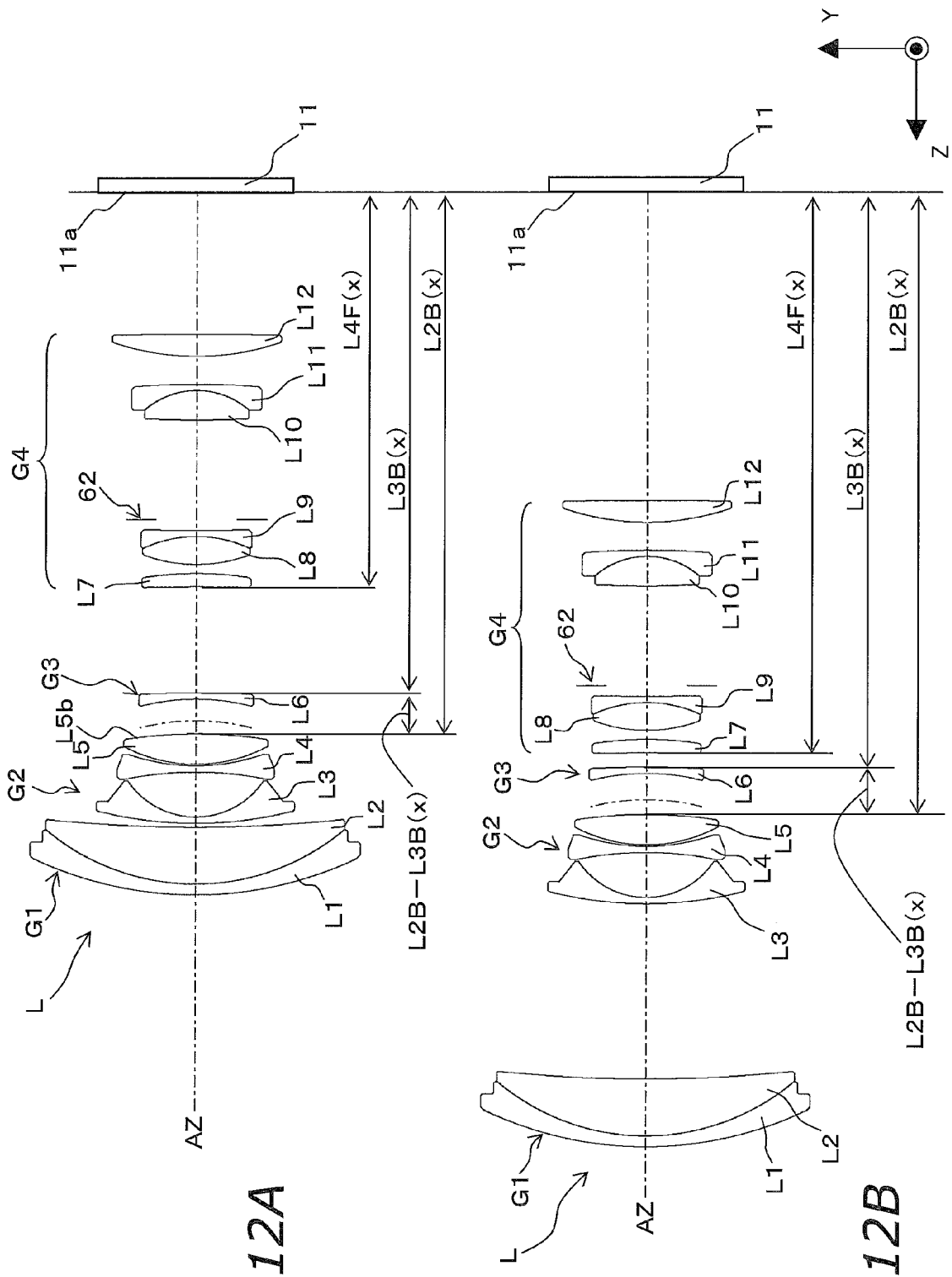
FIG. 12A is diagram of the configuration of an optical system (wide angle end)
FIG. 12B is diagram of the configuration of an optical system (telephoto end)

As shown in FIGS. 9 and 11, a torsion coil spring 68 is attached to the rack support 56c. The torsion coil spring 68 has a wound portion 68a that generates elastic force, a first end 68b, and a second end 68c. The wound portion 68a is fitted to the shaft 66b of the rack 66. With the wound portion 68a twisted, the first end 68b is hooked onto the rack support 56c, while the second end 68c is hooked onto the rack 66. That is, the torsion coil spring 68 imparts rotational force in an A direction to the rack 66, and constantly presses the rack 66 against the lead screw 64a. This reduces backlash between the rack 66 and the lead screw 64a, and increases the positional accuracy of the focus lens unit 75. Also, since the rack 66 is constantly pressed against the lead screw 64a, drive force can be more efficiently transmitted from the lead screw 64a to the rack 66.

The wound portion 68a of the torsion coil spring 68 is also compressed in the Z axis direction (the direction parallel to the center axis R) between the rack support 56c and the rack 66. The torsion coil spring 68 imparts a pressing force F to the rack 66, and the torsion coil spring 68 presses the rack 66 against the rack support 56c. This reduces movement of the rack 66 in the Z axis direction with respect to the rack support 56c, and further improves the positional accuracy of the focus lens unit 75.

The focus motor 64 (an example of the focus actuator) is fixed to the second holder 55. The focus motor 64 is a stepping motor, for example. The focus motor 64 has the lead screw 64a as its rotational shaft extending in the Z axis direction. This lead screw 64a meshes with the rack 66.

The protrusion 56d is a portion for detecting the starting point of the focus lens unit 75, and is provided at a location that can pass through the detection region of a photosensor 67 (discussed below). In this embodiment, since the third lens group G3 (a focus lens group) is formed by the single sixth lens L6, the weight of the third lens group G3 can be 1 g or less, for example, which allows the drive speed with the focus motor 64 to be higher.

The fourth lens group support frame 61 (an example of the second lens support frame) has a first support frame 57, a second support frame 58, a third support frame 59, and a fourth support frame 60. The fourth lens group G4 and the fourth lens group support frame 61 constitute a fourth lens group unit 78 (an example of the second lens unit).

The first support frame 57 supports the seventh lens L7. The second support frame 58 supports the eighth lens L8 and the ninth lens L9, and also supports the first support frame 57 movably in two directions perpendicular to the optical axis AZ. The second support frame 58 has three cam pins 80 that are disposed at a constant pitch around the optical axis AZ.

The third support frame 59 supports the tenth lens L10 and the eleventh lens L11, and is fixed by screws, for example, to the second support frame 58. The fourth support frame 60 supports the twelfth lens L12, and is fixed by screws, for example, to the third support frame 59. Because of their configuration, the first support frame 57, the second support frame 58, the third support frame 59, and the fourth support frame 60 move integrally along the optical axis AZ.

The first support frame 57 is supported by the second support frame 58 so as to be movable in two directions perpendicular to the optical axis AZ, for example. This configuration allows the first support frame 57 to move integrally in the Z axis direction with respect to the second support frame 58, the third support frame 59, and the fourth support frame 60, while allowing movement in a direction perpendicular to the optical axis AZ.

The zoom ring unit 83 has a ring base 86, the zoom ring 84 (an example of the zoom operating unit), and a linear position sensor 87 that detects the rotational position of the zoom ring 84. The "rotational position of the zoom ring 84" refers to the position of the zoom ring 84 in the rotational direction, and can also be considered to be the rotational angle of the zoom ring 84 from a reference position.

The zoom ring 84 has a cylindrical shape, and is supported by the ring base 86 fixed to the fixed frame 50, so as to be movable around the optical axis AZ in a state in which movement in the Z axis direction is restricted. The zoom ring 84 has a through-hole 84a at the end on the Z axis direction negative side. A zoom drive pin 85 that is fixed to the cam barrel 51 is inserted into the through-hole 84a. Consequently, the cam barrel 51 rotates integrally with the zoom ring 84 around the optical axis AZ.

The linear position sensor 87 detects the rotational position and rotational direction in which the user has put the zoom ring 84, and sends the detection result to the lens microcomputer 40. More specifically, the linear position sensor 87 is fixed to the ring base 86 and has a slider 87a that protrudes outward in the radial direction. This slider 87a is inserted into a cam groove 84b formed in the zoom ring 84. When the zoom ring 84 is rotated with respect to the fixed frame 50, the slider 87a moves in the Z axis direction along the cam groove 84b. The linear position sensor 87 has a varistor, and when the slider 87a sliders over a magnetic resistor that is inside this varistor, output (output voltage) that is proportional to the position of the slider 87a in the Z axis direction can be obtained linearly between terminals at both ends to which a specific voltage has been applied. The output of the linear position sensor 87 is converted into rotational position information, which allows the rotational position of the zoom ring 84 to be detected. The focal length of the optical system L is displayed on the outer peripheral face of the zoom ring 84.

Since the first lens group G1 to fourth lens group G4 are mechanically linked via the lens support mechanism 71, the absolute positions of the first lens group G1 to fourth lens group G4 (such as their positions using a light receiving face 11a of the imaging sensor 11 as a reference) have a specific relationship to the rotational position of the zoom ring 84. Therefore, if the rotational position of the zoom ring 84 is detected, the absolute positions of the first lens group G1 to fourth lens group G4 with respect to the lens mount 95 can be ascertained. The zoom ring 84 may have another structure instead, such as a movable lever.

The focus ring unit 88 has a focus ring 89 and a focus ring angle detector 90 that detects the rotational angle of the focus ring 89. The focus ring 89 has a cylindrical shape, and is supported by the ring base 86 rotatably around the optical axis AZ in a state in which movement in the Z axis direction is restricted. The rotational angle and rotational position of the focus ring 89 can be detected by the focus ring angle detector 90. The focus ring angle detector 90 has two photosensors (not shown), for example. The focus ring 89 has a plurality of protrusions 89a that protrude inward in the radial direction and are disposed at equidistant spacing in the rotational direction. Each of these photosensors has a light emitting part (not shown) and a light receiving part (not shown), and the plurality of protrusions 89a pass in between the light emitting parts and the light receiving parts, allowing the rotational angle and rotational direction of the focus ring 89 to be detected. The focus ring 89 may have another structure instead, such as a movable lever.

(3) Focus Adjusting Unit

The focus adjusting unit 72 has the focus motor 64, a focus drive controller 41, and the photosensor 67 (an example of the position sensor). The focus motor 64 is fixed to the second holder 55 and drives the focus lens unit 75 in the Z axis direction with respect to the second lens group unit 77. The drive of the focus lens unit 75 with respect to the second lens group unit 77 is performed by the focus motor 64 alone. In other words, in a state in which the focus motor 64 is not driving the focus lens unit 75 (such as when no power is being supplied to the focus motor 64), the focus lens unit 75 cannot be moved with respect to the second lens group unit 77. In this case, the focus lens unit 75 moves in the Z axis direction integrally with the second holder 55.

The lead screw 64a of the focus motor 64 rotates on the basis of a drive signal inputted from the focus drive controller 41. The rotary motion generated by the focus motor 64 is converted by the lead screw 64a and the rack 66 into linear motion of the focus lens unit 75 in the Z axis direction. Consequently, the focus lens unit 75 can move in the Z axis direction with respect to the second lens group unit 77.

With this digital camera 1, to achieve a zoom lens system with which the focal length can be varied while keeping the subject distance substantially constant, the focus lens unit 75 is driven by the focus adjusting unit 72 on the basis of a tracking table stored ahead of time in the lens microcomputer 40. This type of tracking is called electronic tracking here.

The tracking table contains information indicating the position of the focus lens unit 75 where the focused subject distance remains substantially constant even if the focal length changes (more precisely, the position of the focus lens unit 75 with respect to the second lens group unit 77). The phrase "the subject distance remains substantially constant" means that the amount of change in the subject distance falls within a specific subject field depth. Electronic tracking will be discussed below.

The photosensor 67, which detects the starting point position of the focus lens unit 75, is installed in the second holder 55. This photosensor 67 has a light emitting part (not shown) and a light receiving part (not shown). When the protrusion 56d of the third lens group support frame 56 passes between the light emitting part and the light receiving part, the photosensor 67 can detect the presence of the protrusion 56d. That is, the starting point position of the focus lens unit 75 with respect to the second lens group unit 77 can be detected by the photosensor 67. In other words, the photosensor 67 is a starting point detector that detects the starting point position of the third lens group G3 with respect to the second lens group G2. The lens microcomputer 40 drives the third lens group G3 to the starting point position, and checks whether the focus lens unit 75 (the third lens group G3) is in the starting point position by using a signal from the photosensor 67.

The starting point position that can be detected by the photosensor 67 is an absolute position that never moves with respect to the second lens group unit 77. Accordingly, when the position of the focus lens unit 75 is reset to the starting point position with respect to the second lens group unit 77, the photosensor 67 drives the focus lens unit 75 to the position where the protrusion 56d for starting point detection is detected. When the power switch 25 is turned off, the focus lens unit 75 is driven by the focus motor 64 to a position where the protrusion 56d of the third lens group 56 is detected by the photosensor 67 regardless of the position of focus lens unit 75, for example. Upon completion of the drive of the focus lens unit 75, the power supply to the digital camera 1 is halted. Conversely, when a power switch 25 of the digital camera 1 is turned on, the focus motor 64 drives the focus lens unit 75 to a specific position determined on the basis of the tracking table. The starting point detector is not limited to being a photosensor, and may instead be a combination of a magnet and a magnetic sensor, for example.

(4) Aperture Adjusting Unit

The aperture adjusting unit 73 has the aperture unit 62 fixed to the second support frame 58, an aperture drive motor (not shown) that drives the aperture unit 62, and an aperture drive controller 42 that controls the aperture drive motor. The aperture drive motor is a stepping motor, for example. The aperture drive motor is driven on the basis of a drive signal inputted from the aperture drive controller 42. The drive force generated by the aperture drive motor drives aperture blades 62a in the opening and closing directions. The aperture value of the optical system L can be changed by driving the aperture blades 62a.

(5) Blur Correction Unit

The blur correction unit 74 is for reducing blurring of the optical image attributable to movement of the interchangeable lens unit 2 and the camera body 3, and has an electromagnetic actuator 46, a position detecting sensor 47, and a blur correction microprocessor 48.

The electromagnetic actuator 46 drives the first support frame 57 in a direction perpendicular to the optical axis AZ. More specifically, the electromagnetic actuator 46 has a magnet (not shown) and a coil (not shown), for example. For instance, the coil is provided to the first support frame 57, and the magnet is fixed to the second support frame 58.

The position detecting sensor 47 is for detecting the position of the first support frame 57 with respect to the second support frame 58, and is a hole element, for example. A movement detecting sensor (not shown) such as a gyro sensor is installed in the interchangeable lens unit 2. The blur correction microprocessor 48 controls the electromagnetic actuator 46 on the basis of the detection result of the position detecting sensor 47 and the detection result of the movement detecting sensor. Consequently, blurring of the optical image attributable to movement of the digital camera 1 can be reduced.

Reducing blurring of the subject image may instead be accomplished by electronic blur correction, in which blurring that appears in an image is corrected on the basis of image data outputted from the imaging sensor 11. Also, blurring of the subject image may be reduced by a sensor shift method in which the imaging sensor 11 is driven in two directions perpendicular to the optical axis AZ.

(6) Lens Microprocessor

The lens microcomputer 40 has a CPU (not shown), a ROM (not shown), and a memory 40a, and various functions can be performed by reading programs stored in the ROM into the CPU. For instance, the lens microcomputer 40 can check whether the focus lens unit 75 is in the starting point position by using a detection signal from the photosensor 67.

The memory 40a is a nonvolatile memory, and can hold stored information even when no power is being supplied. The memory 40a contains a tracking table (discussed below) for realizing a zoom lens system, or information related to the interchangeable lens unit 2 (lens information), for example. The lens microcomputer 40 controls the focus motor 64, and the focus lens unit 75 is driven by the focus motor 64 in the Z axis direction, on the basis of this tracking table. An operation in which the position of the focus lens unit 75 is made to conform to changes in the focal length on the basis of a tracking table will hereinafter be referred to as electronic tracking.

The lens microcomputer 40 has a counter 40b for counting the number of pulses of the focus motor 64. The counter 40b is set to a count of "+1" when the focus lens unit 75 is driven to the Z axis direction positive side, and to a count of "−1" when the focus lens unit 75 is driven to the Z axis direction negative side. The lens microcomputer 40 can ascertain the relative position of the third lens group G3 with respect to the second lens group G2 (the position of the focus lens unit 75 with respect to the second lens group unit 77) by thus counting the number of drive pulses of the focus motor 64.

For example, the rack 66 is driven by 0.6 mm in the Z axis direction for every rotation of the lead screw 64a of the focus motor 64. If the focus motor 64, which has a 10-pole magnet, is driven by 1-2 phase excitation, then the rack 66 is driven in the Z axis direction by 0.6/20/2=0.015 mm (15 μm) per pulse. During micro-step drive, the rack 66 can be driven in even finer units. Using a stepping motor allows the focus lens unit 75 to be driven in fine units, and reduces backlash during reverse drive, for example. That is, selecting a stepping motor as the focus motor 64 affords very precise focus adjustment. Also, counting the number of drive pulses allows the current position of the focus lens unit 75 with respect to the second lens group unit 77 to be ascertained, and allows the amount of drive of the focus lens unit 75 to be calculated.

Camera Body

The basic configuration of the camera body 3 will be described through reference to FIGS. 1 to 4B. As shown in FIGS. 1 to 4B, the camera body 3 has a case 3a, a body mount 4, an operating unit 39, an image acquisition unit 35, an image display unit 36, a viewfinder unit 38, a body microcomputer 10 (an example of the drive controller, and an example of the auxiliary operation detector), and a battery 22 (an example of the main power supply).

(1) Case

The case 3a constitutes the outer part of the camera body 3. As shown in FIGS. 4A and 4B, the body mount 4 is provided to the front face of the case 3a, and the operating unit 39 is provided to the rear and top faces of the case 3a. More specifically, a display unit 20, the power switch 25, a mode selector dial 26, a navigation key 27, a menu setting button 28, a setting button 29, a mode selector button 34, and a moving picture capture operation button 24 are provided to the rear face of the case 3a. A shutter button 30 is provided to the top face of the case 3a.

(2) Body Mount

The body mount 4 is the portion of the interchangeable lens unit 2 where the lens mount 95 is mounted, and has a body-side contact (not shown) that can be electrically connected with the lens-side contact 91. The camera body 3 is able to send and receive data to and from the interchangeable lens unit 2 via the body mount 4 and the lens mount 95. For example, the body microcomputer 10 (discussed below) sends the lens microcomputer 40 a control signal, such as an exposure synchronization signal, via the body mount 4 and the lens mount 95.

(3) Control Unit

As shown in FIGS. 4A and 4B, the operating unit 39 has various controls that the user can use to input operating information. For instance, the power switch 25 is a switch for turning the power on and off to the digital camera 1 or the camera body 3. When the power is turned on with the power switch 25, power is supplied to the various parts of the camera body 3 and the interchangeable lens unit 2.

The mode selector dial 26 is used to switch the operating mode, such as still picture capture mode, moving picture capture mode, or reproduction mode, and the user can turn the mode selector dial 26 to switch the operating mode. When the still picture capture mode is selected with the mode selector dial 26, the operating mode is switched to the still picture capture mode, and when the moving picture capture mode is selected with the mode selector dial 26, the operating mode is switched to the moving picture capture mode. In the moving picture capture mode, basically moving picture capture is possible. When the reproduction mode is selected with the mode selector dial 26, the operating mode is switched to the reproduction mode, allowing the captured image to be displayed on the display unit 20.

The navigation key 27 is used to select the left, right, up, and down directions. The user can use the navigation key 27 to select the desired menu from various menu screens displayed on the display unit 20, for example.

The menu setting button 28 is for setting the various operations of the digital camera 1. The setting button 29 is for executing the operations of the various menus.

The moving picture capture operation button 24 is for starting and stopping the capture of moving pictures. Even if the operating mode selected with the mode selector dial 26 is the still picture capture mode or the reproduction mode, when the moving picture capture operation button 24 is pressed, the operating mode is forcibly changed to the moving picture capture mode, and moving picture capture begins, regardless of the setting on the mode selector dial 26. When this moving picture capture operation button 24 is pressed during the capture of a moving picture, the moving picture capture ends and the operating mode changes to the one selected on the mode selector dial 26, that is, to the one prior to the start of moving picture capture. For example, if the still picture capture mode has been selected with the mode selector dial 26 when the moving picture capture operation button 24 is pressed, the operating mode automatically changes to the still picture capture mode after the moving picture capture operation button 24 is pressed again.

The shutter button 30 is pressed by the user to capture an image. When the shutter button 30 is pressed, a timing signal is outputted to the body microcomputer 10. The shutter button 30 is a two-stage switch that can be pressed halfway down or all the way down. Light measurement and ranging are commenced when the user presses the button half way down. When the user presses the shutter button 30 all the way down in a state in which the shutter button 30 has been pressed half way down, a timing signal is outputted, and image data is acquired by the image acquisition unit 35.

As shown in FIG. 2, a lens attachment button 99 (an example of the lens attachment operating unit) for attaching and removing the interchangeable lens unit 2 to and from the camera body 3 is provided to the front face of the camera body 3. The lens attachment button 99 has a contact (not shown) that is in its "on" state when the button is pressed by the user, for example, and is electrically connected to the body microcomputer 10. When the lens attachment button 99 is pressed, the built-in contact is switched on, and the body microcomputer 10 recognizes that the lens attachment button 99 has been pressed.

(4) Image Acquisition Unit

The image acquisition unit 35 mainly comprises the imaging sensor 11 (an example of the imaging element) such as a CCD (Charge Coupled Device) that performs opto-electrical conversion, a shutter unit 33 that adjusts the exposure state of the imaging sensor 11, a shutter controller 31 that controls the drive of the shutter unit 33 on the basis of a control signal from the body microcomputer 10, and an imaging sensor drive controller 12 that controls the operation of the imaging sensor 1.

The imaging sensor 11 is a CCD (Charge Coupled Device) sensor, for example, that converts the optical image formed by the optical system L into an electrical signal. The imaging sensor 11 is driven and controlled on the basis of timing signals generated by the imaging sensor drive controller 12. The imaging sensor 11 may instead be a CMOS (Complementary Metal Oxide Semiconductor) sensor.

The shutter controller 31 drives a shutter drive actuator 32 and operates the shutter unit 33 according to a control signal outputted from the body microcomputer 10 that has received a timing signal.

The auto-focusing method that is employed in this embodiment is a contrast detection method that makes use of image data produced by the imaging sensor 1. Using a contrast detection method allows high-precision focal adjustment.

(5) Body Microprocessor

The body microcomputer 10 is a control device that is the command center of the camera body 3, and controls the various components of the digital camera 1 according to operation information inputted to the operation unit 39. More specifically, the body microcomputer 10 is equipped with a CPU, ROM, and RAM, and the programs held in the ROM are read by the CPU, allowing the body microcomputer 10 to perform a variety of functions. For instance, the body microcomputer 10 has the function of detecting that the interchangeable lens unit 2 has been mounted to the camera body 3, or the function of acquiring information about controlling the digital camera 1, such as information about the focal length from the interchangeable lens unit 2.

The body microcomputer 10 is able to receive signals from the power switch 25, the shutter button 30, the mode selector dial 26, the navigation key 27, the menu setting button 28, and the setting button 29. Various information related to the camera body 3 is held in a memory 10a inside the body microcomputer 10. The memory 10a is a nonvolatile memory, and can hold stored information even when no power is being supplied.

Also, the body microcomputer 10 periodically produces a vertical synchronization signal, and produces an exposure synchronization signal on the basis of the vertical synchronization signal in parallel with the production of the vertical synchronization signal. The body microcomputer 10 can produce an exposure synchronization signal, since the body microcomputer 10 ascertains beforehand the exposure start timing and the exposure stop timing based on the vertical synchronization signal. The body microcomputer 10 outputs a vertical synchronization signal to a timing generator (not shown), and outputs an exposure synchronization signal at a specific period to the lens microcomputer 40 via the body mount 4 and the lens mount 95. The lens microcomputer 40 acquires position information about the focus lens unit 75.

The imaging sensor drive controller 12 produces an electronic shutter drive signal and a read signal of the imaging sensor 11 at a specific period on the basis of the vertical synchronization signal. The imaging sensor drive controller 12 drives the imaging sensor 11 on the basis of the electronic shutter drive signal and the read signal. That is, the imaging sensor 11 reads to a vertical transfer part (not shown) the image data produced by numerous opto-electrical conversion element (not shown) present in the imaging sensor 11, according to the read signal.

The body microcomputer 10 also controls the focus adjusting unit 72 (discussed below) via the lens microcomputer 40.

The image signal outputted from the imaging sensor 11 is sent from an analog signal processor 13 and successively processed by an A/D converter 14, a digital signal processor 15, a buffer memory 16, and an image compressor 17. The analog signal processor 13 subjects the image signal outputted from the imaging sensor 11 to gamma processing or other such analog signal processing. The A/D converter 14 converts the analog signal outputted from the analog signal processor 13 into a digital signal. The digital signal processor 15 subjects the image signal converted into a digital signal by the A/D converter 14 to digital signal processing such as noise elimination or contour enhancement. The buffer memory 16 is a RAM (Random Access Memory), and temporarily stores the image signal. The image signal stored in the buffer memory 16 is sent to and processed by first the image compressor 17 and then an image recorder 18. The image signal stored in the buffer memory 16 is read at a command from an image recording controller 19 and sent to the image compressor 17. The data of the image signal sent to the image compressor 17 is compressed into an image signal according to a command from the image recording controller 19. This compression adjusts the image signal to a smaller data size than that of the original data. An example of the method for compressing the image signal is the JPEG (Joint Photographic Experts Group) method in which compression is performed on the image signal for each frame. After this, the compressed image signal is recorded by the image recording controller 19 to the image recorder 18. When a moving picture is recorded, JEPG was used to compress a plurality of image signals, compressing an image signal for each frame, and an H. 264/AVC method can also be used, in which compression is performed on image signals for a plurality of frames all at once.

The image recorder 18 produces a still picture file or moving picture file that is associated with specific information to be recorded with the image signal. The image recorder 18 also records the still picture file or moving picture file on the basis of a command from the image recording controller 19. The image recorder 18 is a removable memory and/or an internal memory, for example. The specific information to be recorded with the image signal includes the date the image was captured, focal length information, shutter speed information, aperture value information, and photography mode information. Still picture files are in Exif (TRADEMARK) format or a format similar to Exif (TRADEMARK) format. Moving picture files are in H. 264/AVC format or a format similar to H. 264/AVC format.

(6) Image Display Unit

The image display unit 36 has the display unit 20 and an image display controller 21. The display unit 20 is a liquid crystal monitor, for example. The display unit 20 displays as a visible image the image signal recorded to the buffer memory 16 or the image recorder 18 on the basis of a command from the image display controller 21. Possible display modes on the display unit 20 include a display mode in which only the image signal is displayed as a visible image, and a display mode in which the image signal and information from the time of capture are displayed as a visible image.

(7) Viewfinder

The viewfinder unit 38 has a liquid crystal viewfinder 8 that displays the image acquired by the imaging sensor 11, and a viewfinder eyepiece window 9 provided to the rear face of the case 3a. The user looks into the viewfinder eyepiece window 9 to view the image displayed on the liquid crystal viewfinder 8.

(8) Battery

The battery 22 supplies power to the various components of the camera body 3, and also supplies power to the interchangeable lens unit 2 via the lens mount 95. In this embodiment, the battery 22 is a rechargeable battery. The battery 22 may be a dry cell, or may be an external power supply, with which power is supplied from the outside through a power cord.

Tracking Table

Figure 14:
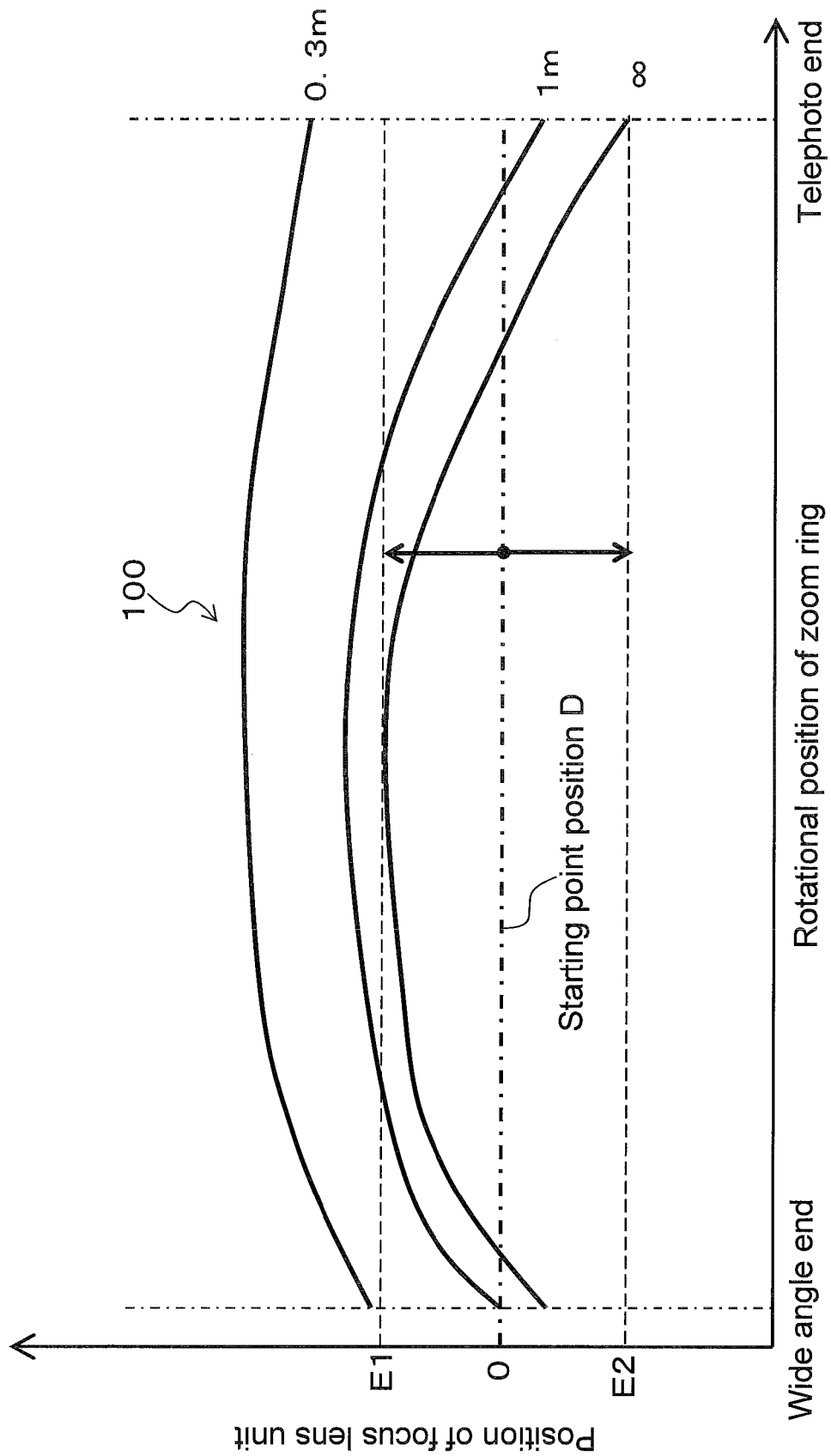
FIG. 14 is a tracking table for realizing a zoom lens system.

With the digital camera 1, electronic tracking is performed by the focus adjusting unit 72 so that the focal length can be varied while the subject distance is kept substantially constant. More specifically, as shown in FIG. 14, to perform electronic tracking, a tracking table 100 is held in the memory 40a. This tracking table 100 shows the relationship between the rotational position of the zoom ring 84 and the position of the focus lens unit 75 in the Z axis direction with respect to the second lens group unit 77. For example, the memory 40a holds three tracking tables 100 corresponding to subject distances of 0.3 m, 1.0 m, and infinity ($\infty$).

The tracking table 100 consists of discrete information in which the rotational position of the zoom ring 84 and the position of the focus lens unit 75 in the Z axis direction are divided into several groups. In general, the number of divisions is determined so that the subject distance will fit within a specific subject field depth even if the zoom ring 84 is turned.

The rotational position of the zoom ring 84 (position in the rotational direction) can be detected by the linear position sensor 87. On the basis of this detection result and the tracking table 100, the lens microcomputer 40 can determine the position of the focus lens unit 75 in the Z axis direction with respect to the second lens group unit 77.

The starting point position D of the focus lens unit 75 with respect to the second lens group unit 77 is detected by the photosensor 67, which is indicated by the one-dot chain line in FIG. 14. In this embodiment, the starting point position D is located near the center of the movement range of the focus lens unit 75 (between positions E1 and E2) in the infinity tracking table 100. Thus disposing the starting point position D near the center allows the focus lens unit 75 to be moved relatively quickly to any position when the power is turned on to the digital camera 1.

The reason the starting point position D is determined using the infinity tracking table 100 as a reference is that there is a higher probability of capturing the subject at the infinity position when the user turns on the power to the digital camera 1 to photograph the subject.

The tracking table 100 may also be expressed by a polynomial, rather than discrete information divided into several groups. Position information about the first lens group G1, second lens group G2, or fourth lens group G4 in the Z axis direction may also be used instead of the rotational position of the zoom ring 84. The "position of the focus lens unit 75 in the Z axis direction with respect to the second lens group unit 77" can be rephrased as the position of the third lens group G3 in the Z axis direction with respect to the second lens group unit 77, or the position of the third lens group G3 in the Z axis direction with respect to the second lens group G2.

Distance Between Members

As discussed above, the third lens group G3 used for focal adjustment is driven in the Z axis direction by electronic tracking, but since the supply of power to the focus motor 64 is halted when the power supply of the camera body 3 is off, the focus motor 64 does not drive the focus lens unit 75. Therefore, if the power supply of the interchangeable lens unit 2 should be turned off during use of the digital camera 1 by removing the battery 22 from the camera body 3 or removing the interchangeable lens unit 2 from the camera body 3, the focus motor 64 will come to a stop at that point.

If the zoom ring 84 is operated in this state, there is the danger that the members may come into contact. For example, if the focus lens unit 75 and the fourth lens group unit 78 come into contact, the rack 66 attached to the third lens group support frame 56 may come loose from the lead screw 64a of the focus motor 64, or the rack 66 may be damaged.

Figure 15:
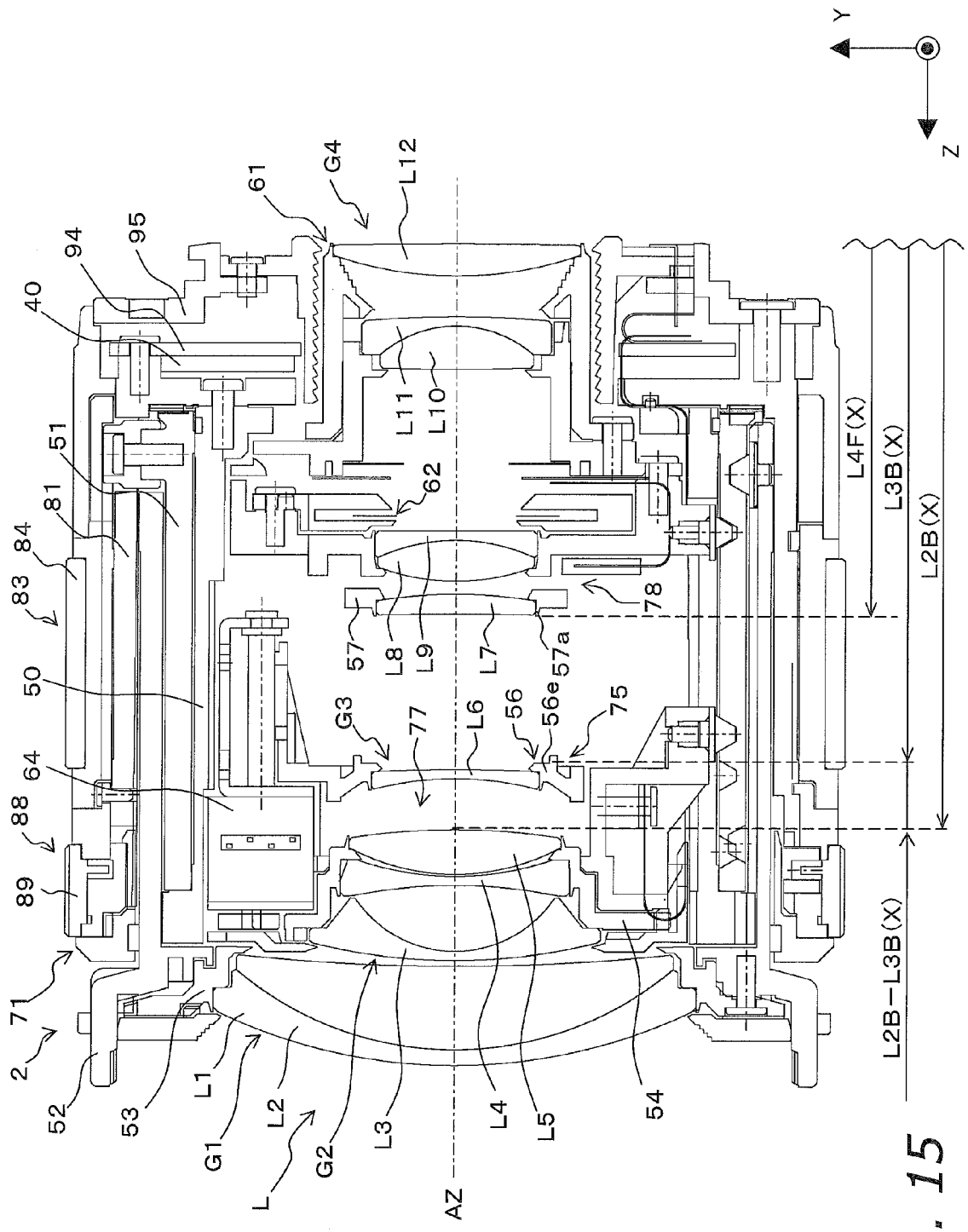
FIG. 15 is a cross section of an interchangeable lens unit (wide angle end)
Figure 16:
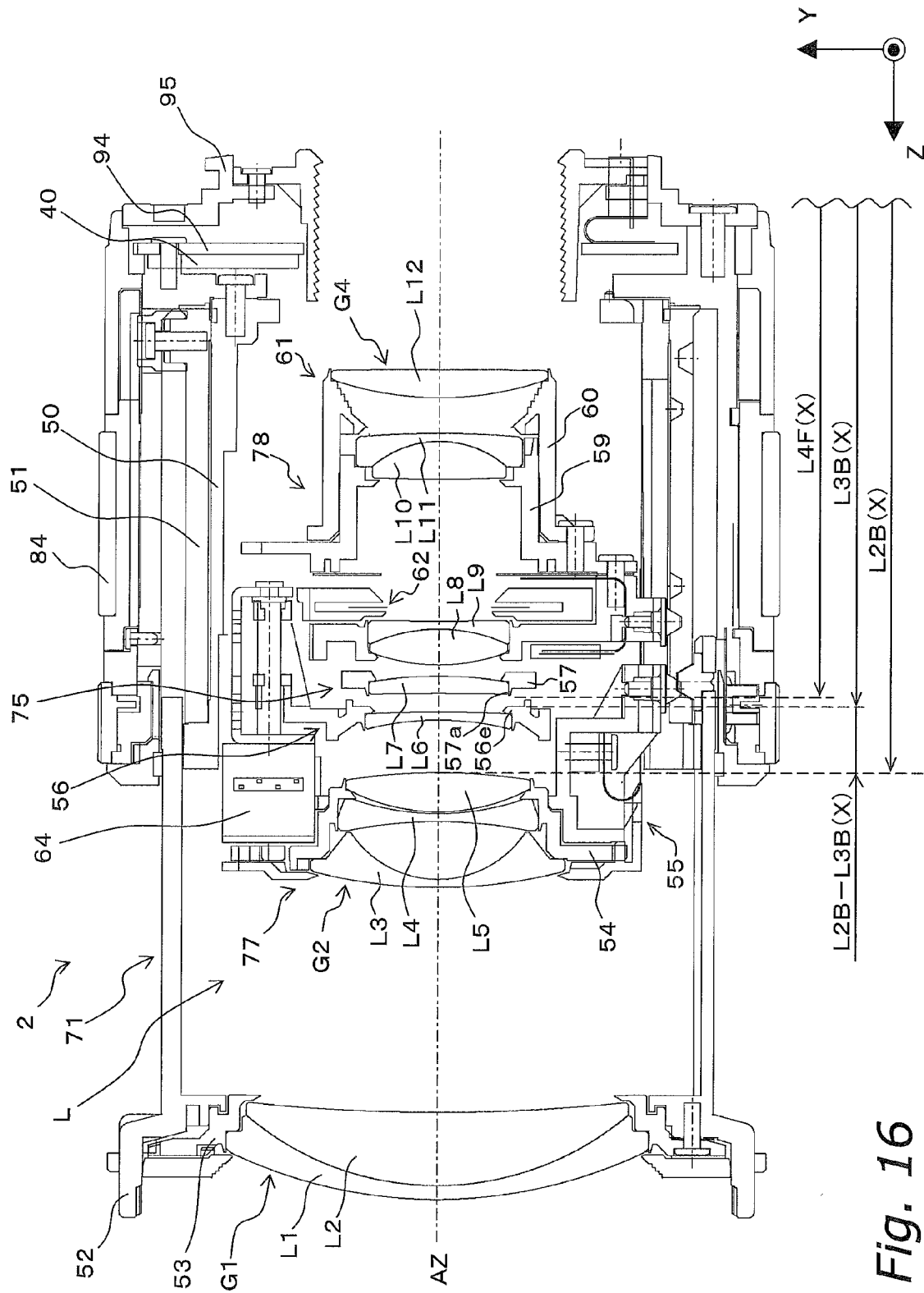
FIG. 16 is a cross section of an interchangeable lens unit (telephoto end)

With the digital camera 1, however, the positions of the focus lens unit 75 and the fourth lens group unit 78 are determined so that the members will not come into contact even if the zoom ring 84 is operated while the power is off The positional relationship of the various components will now be described. FIG. 14 shows the tracking table of the focus adjusting unit 72. This tracking table is information indicating the position of the focus lens unit 75 at which the in-focus subject distance remains substantially constant even if the focal length changes. FIG. 15 is a cross section of the interchangeable lens unit 2 at the wide angle end (corresponds to FIG. 12A). FIG. 16 is a cross section of the interchangeable lens unit 2 at the telephoto end (corresponds to FIG. 12B). FIGS. 12A, 12B, 15, and 16 show a state in which the third lens group G3 is disposed at a position where the subject distance is infinity.

As shown in FIGS. 12A and 12B, we will let L2B(x) be the distance from the light receiving face 11a of the imaging sensor 11 to the rear face of the second lens group G2 (more precisely, the rear face L5b of the fifth lens L5), let L3B(x) be the distance from the light receiving face 11a to the rear face of the third lens group support frame 56 (more precisely, the rear face of the support part 56e (see FIGS. 15 and 16) of the third lens group support frame 56), and let L4F(x) be the distance from the light receiving face 11a to the front face of the first support frame 57 (more precisely, the front face of the annular part 57a (see FIGS. 15 and 16) of the first support frame 57). We will let L2B−L3B(x) be the distance between the distance L2B(x) and the distance L3B(x), and let Lmax=L2B−L3B(Max) be the maximum value thereof "x" here is a variable expressing the rotational position (zoom position) of the zoom ring 84. In this case, the distance L2B(x)−Lmax at each zoom position can be indicated by a dotted line M. This dotted line M means a state in which the third lens group G3 is located the farthest to the fourth lens group G4 side. Contact between this dotted line M and the line L4F(x) means that the third lens group G3 and the fourth lens group G4 are in contact. In this embodiment, Lmax=L2B−L3B(tele).

With this digital camera 1, the positions of the optical system L and the various lens support frames are determined so as to satisfy the following Formula 1.

$$L2B(x)-\{L2B-L3B(Max)\}>L4F(x) \quad (1)$$

Since this Formula 1 is satisfied with the digital camera 1, a gap can be ensured at all times in the Z axis direction between the focus lens unit 75 and the fourth lens group unit 78. For example, as shown in FIG. 13, when the rotational position of the zoom ring 84 is position A1, the focus lens unit 75 is closest to the fourth lens group unit 78, but even in this state a gap is ensured between the focus lens unit 75 and the fourth lens group unit 78. In other words, when the zoom ring 84 is operated in a state in which the distance in the Z axis direction between the second lens group unit 77 and the focus lens unit 75 is greatest, a gap is ensured at all times between the focus lens unit 75 and the fourth lens group unit 78. Accordingly, even if the zoom ring 84 is operated in a state in which no power is supplied to the focus motor 64, there will be no contact between the focus lens unit 75 and the fourth lens group unit 78. As a result, damage to the members can be prevented with this digital camera 1.

Operation of the Digital Camera

The operation of the digital camera 1 will be described.

(1) Imaging Mode

This digital camera 1 has two imaging modes. More specifically, the digital camera 1 has a viewfinder imaging mode in which the user looks through the viewfinder eyepiece window 9 to view the subject, and a monitor imaging mode in which the user observes the subject on the display unit 20.

With the viewfinder imaging mode, the image display controller 21 drives the liquid crystal viewfinder 8, for example. As a result, an image of the subject (a so-called through-image) acquired by the imaging sensor 11 is displayed on the liquid crystal viewfinder 8.

With the monitor imaging mode, the display unit 20 is driven by the image display controller 21, for example, and a real-time image of the subject is displayed on the display unit 20. Switching between these two imaging modes can be performed with the mode selector button 34.

(2) Zoom Operation

Next, the operation of the interchangeable lens unit 2 when the user performs zooming will be described.

When the user rotates the zoom ring 84, the cam barrel 51 rotates along with the zoom ring 84. When the cam barrel 51 rotates around the optical axis AZ, the first holder 52 is guided by the first cam grooves 51d of the cam barrel 51, and advances in the Z axis direction. The second holder 55 and the fourth lens group support frame 61 are also guided by the second cam grooves 51b and the third cam grooves 51c of the cam barrel 51, and advance in the Z axis direction. Thus, by rotating the zoom ring 84, the state of the interchangeable lens unit 2 can be changed from the wide angle end state shown in FIGS. 5 and 6 to the telephoto end state shown in FIGS. 7 and 8. Consequently, the subject can be imaged at the desired zoom position by adjusting the rotational position of the zoom ring 84.

The second holder 55 is mechanically driven in the Z axis direction by rotating the zoom ring 84 here, but only the focus lens unit 75 is electrically driven and controlled by the focus adjusting unit 72 on the basis of the tracking table 100 stored ahead of time in the memory 40a, so that the subject distance remains substantially constant. For example, when the focus lens unit 75 is driven by the focus motor 64 on the basis of the tracking table 100, the focal state can be kept at infinity both when the move is from the wide angle end to the telephoto end, and when the move is from the telephoto end to the wide angle end.

More precisely, when the zoom ring 84 is turned, the first lens group G1, the second lens group G2, the third lens group G3, and the fourth lens group G4 move in the Z axis direction along the optical axis AZ. Consequently, the magnification of the subject image changes. At this point the third lens group G3 also moves in the Z axis direction along the optical axis AZ in a state of being supported by the second holder 55 via the third lens group support frame 56. When there is a relative change in the positional relationship of the first lens group G1, the second lens group G2, the third lens group G3, and the fourth lens group G4, the focal state of the subject image formed on the imaging sensor 11 also changes. That is, the subject distance at which the focal point is formed on the imaging sensor 11 changes.

In view of this, with the digital camera 1, even if the focal length changes, the subject distance can be kept substantially constant by driving the focus motor 64 according to the rotational position of the zoom ring 84. More specifically, using just the focus motor 64, the focus lens unit 75 including the third lens group G3 is driven with respect to the second lens group unit 77. The lens microcomputer 40 acquires the rotational position of the zoom ring 84 on the basis of the detection signal of the linear position sensor 87. At the same time, the lens microcomputer 40 calculates the position of the focus lens unit 75 with respect to the second lens group unit 77 from the count value at the counter 40b. Utilizing the plurality of tracking tables 100 shown in FIG. 14, the lens microcomputer 40 finds the current subject distance from these two pieces of information (the current rotational position of the zoom ring 84, and the position of the focus lens unit 75 with respect to the second lens group unit 77), and selects the tracking table 100 corresponding to the subject distance thus found. Here, we will assume that the tracking table 100 corresponding to infinity was selected.

Next, the lens microcomputer 40 again acquires the rotational position of the zoom ring 84, and finds the rotational speed of the zoom ring 84, that is, the rate of change in the focal length, from the amount of change in the rotational position of the zoom ring 84.

Next, the lens microcomputer 40 predicts the rotational position of the zoom ring 84 after the elapse of a specific time from the current rotational angle of the zoom ring 84 and the rotational speed of the zoom ring 84, and finds as a target position the position of the focus lens unit 75 in the Z axis direction corresponding to the predicted rotational position of the zoom ring 84. After the elapse of a specific time, the lens microcomputer 40 drives the focus motor 64 via the focus drive controller 41 so that the focus lens unit 75 will be located at this target position. Consequently, the focus lens unit 75 is driven so as to follow the movement of the other lens groups, and the subject distance is kept constant.

Thus, in the electronic tracking operation, the lens microcomputer 40 predicts the change in the focal length that will accompany zooming operation, and acquires from the tracking table 100 the target position of the focus lens unit 75 corresponding to the predicted focal length. The focus lens unit 75 is driven to the target position by the focus motor 64 in parallel with the zooming operation of the optical system L. Since this operation is executed at specific time intervals, even if the zoom ring 84 is rotated and the focal length of the optical system L changes, the focus lens unit 75 will move to the Z axis direction position corresponding to the focal length on the basis of the tracking table 100, and the drive of the focus lens unit 75 can conform to the change in the focal length. Consequently, the subject distance can be kept substantially constant regardless of any change in the focal length. The control of these components may be performed by the body microcomputer 10, rather than lens microcomputer 40.

Similarly, when the focused subject distance is short, such as 1 m, for example, the tracking table 100 for which the subject distance is 1 m is selected, and both when the move is from the wide angle end to the telephoto end, and when the move is from the telephoto end to the wide angle end, the focused state at a short distance can be maintained by driving the focus motor 64, and the zooming operation can be carried out smoothly.

In particular, since the focus lens unit 75 and the focus motor 64 move in the Z axis direction integrally with the second lens group unit 77, even if the user turns the zoom ring 84 quickly, the focus lens unit 75 can still be moved integrally with the second lens group unit 77. Therefore, if the subject distance is to be kept substantially constant before and after the zooming operation, the focus motor 64 may move the third lens group G3 by a distance obtained by subtracting the distance that the second lens group G2 is moved by the cam mechanism with respect to the imaging sensor 11 from the distance that the third lens group G3 is to be moved with respect to the imaging sensor 11. This makes it easy to keep up with fast operation of the zoom ring 84 by the user.

Also, in this embodiment, if a zooming operation is performed from the wide angle end to the telephoto end, with the subject distance at infinity, the focus lens unit 75 (more precisely, the third lens group G3, which is a focus lens group) must be moved in the Z axis direction by about 3 mm with respect to the imaging sensor 11. When the focus motor 64 is driven at 800 pps, the amount of drive of the focus lens unit 75 per rotation of the focus motor 64 is 0.6 mm as mentioned above, so it takes 0.25 second to move the focus lens unit 75 by 3 mm in the Z axis direction on the basis of the tracking table. Since it is possible to move the focus lens unit 75 from the wide angle end to the telephoto end in approximately 0.25 second, even if the user should turn the zoom ring 84 from the wide angle end to the telephoto end in 0.5 second, the drive of the focus lens unit 75 can keep up with the change in focal length. Consequently, even if the user should perform a quick zooming operation while looking at the subject on the display unit 20 in live view mode, for example, the subject image that shows on the display unit 20 will be unlikely to be blurred, and this makes the camera easier to use.

(3) Focusing Operation

Next, the focusing operation of the digital camera 1 will be described. The digital camera 1 has two focus modes: an auto-focus imaging mode and a manual imaging mode. The user of the digital camera 1 can select the focus mode with a focus imaging mode setting button (not shown) provided to the camera body 3.

In the auto-focus imaging mode, auto-focus operation is performed by contrast detection method. When auto-focusing is performed by contrast detection method, the body microcomputer 10 asks the lens microcomputer 40 for contrast AF data. This contrast AF data is necessary in auto-focusing by contrast detection method, and includes, for example, the focus drive speed, focus shift amount, image magnification ratio, and information about whether contrast AF is possible.

The body microcomputer 10 monitors whether or not the shutter button 30 has been pressed half way down. If the shutter button 30 has been pressed half way down, the body microcomputer 10 issues an auto-focus commencement command to the lens microcomputer 40. This auto-focus commencement command is to start the auto-focus operation by contrast detection method. Upon receiving this command, the lens microcomputer 40 drives and controls the focus motor 64, which is a focus actuator. More precisely, the lens microcomputer 40 sends a control signal to the focus drive controller 41. On the basis of this control signal, the focus drive controller 41 drives the focus motor 64, and the focus lens unit 75 moves minutely.

The body microcomputer 10 calculates an evaluation value for auto-focus operation (hereinafter referred to as an AF evaluation value) on the basis of the received image data.

More specifically, the body microcomputer 10 sends a command to the digital signal processor 15. The digital signal processor 15 sends an image signal to the body microcomputer 10 at a specific timing on the basis of the received command. The body microcomputer 10 finds a brightness signal from the image data produced by the imaging sensor 11, and finds the AF evaluation value by integrating the high-frequency component within the screen of the brightness signal. The AF evaluation value thus calculated is stored in a DRAM (not shown) in a state of being associated with the exposure synchronization signal. Since the lens position information acquired by the body microcomputer 10 from the lens microcomputer 40 is also associated with the exposure synchronization signal, the body microcomputer 10 can store the AF evaluation value with it associated with the lens position information.

Next, the body microcomputer 10 extracts as the focal point the position of the focus lens unit 75 where the AF evaluation value is at its maximum, on the basis of the AF evaluation value stored in the DRAM. The method for driving the focus lens unit 75 in the extraction of the focal point is generally known as a hill climbing method. With a hill climbing method, the focus lens unit 75 is moved in the direction of increasing the AF evaluation value, and the AF evaluation value is found for each position of the focus lens unit 75. This operation is continued until the maximum value for the AF evaluation value is detected, that is, until the AF evaluation value increases up to its peak and begins to decrease.

The body microcomputer 10 sends a control signal to the focus drive controller 41 via the lens microcomputer 40 so that the focus lens unit 75 will be driven to the position corresponding to the extracted focal point. The focus drive controller 41 produces a drive pulse for driving the focus motor 64 on the basis of a control signal from the body microcomputer 10 (or the lens microcomputer 40), for example. The focus motor 64 is driven by an amount corresponding to this drive signal, and the focus lens unit 75 moves in the Z axis direction to the position corresponding to the focal point.

Focusing in auto-focus imaging mode is performed in this way with the digital camera 1. The above operation is executed instantly when the user presses the shutter button 30 half way down.

Focusing by contrast detection method can also be carried out in monitor imaging mode (known as viewfinder mode), in which real-time image data can be produced with the imaging sensor 11. The reason for this is that in viewfinder mode, image data is produced in a steady state by the imaging sensor 11, and auto-focusing by contrast detection method using this image data is easy.

In viewfinder mode, since a real-time image of the subject is displayed on the display unit 20, the user can decide on the composition for taking the still picture or moving picture while looking at the display unit 20. Also, there is another imaging mode the user can select in addition to live view mode using the display unit 20, which is a second live view mode (viewfinder imaging mode) in which the subject image from the interchangeable lens unit 2 is guided to the liquid crystal viewfinder 8 (viewfinder unit 38).

The manual focus imaging mode will now be described.

When the user turns the focus ring 89, the focus ring angle detector 90 detects the rotational angle of the focus ring 89 and outputs a signal corresponding to this rotational angle. The focus drive controller 41 is able to receive signals from the focus ring angle detector 90, and able to send signals to the focus motor 64. The focus drive controller 41 sends the decision result to the lens microcomputer 40. The focus drive controller 41 drives the focus motor 64 on the basis of a control signal from the lens microcomputer 40. More precisely, the lens microcomputer 40 produces a drive signal for driving the focus motor 64 on the basis of a focus ring rotational angle signal. When the lead screw 64a of the focus motor 64 rotates according to the drive signal, the focus lens unit 75 moves in the Z axis direction via the rack 66 that meshes with the lead screw 64a. In the wide angle end state shown in FIGS. 5 and 6, the subject distance is infinity, but as the subject distance draws closer, the focus lens unit 75 moves to the Z axis direction positive side. Similarly, in the telephoto end state shown in FIGS. 7 and 8, the subject distance is infinity, but as the subject distance becomes shorter, the focus lens unit 75 moves to the Z axis direction positive side. The amount of movement of the focus lens unit 75 is greater in this case than in the case of the wide angle end.

In this way, the user can perform focusing by turning the focus ring 89 while looking at the subject on the display unit 20. In the manual focus imaging mode, when the user presses the shutter button 30 all the way down, imaging is performed in this unchanged state.

(4) Still Picture Imaging

When the user presses the shutter button 30 all the way down, a command is sent from the body microcomputer 10 to the lens microcomputer 40 so that the aperture value of the optical system L will be set to the aperture value calculated on the basis of the light measurement output of the imaging sensor 11. The aperture drive controller 42 is controlled by the lens microcomputer 40, and the aperture unit 62 is constricted to the indicated aperture value. Simultaneously with the indication of the aperture value, a drive command is sent from the imaging sensor drive controller 12 to the imaging sensor 11, and a shutter unit 33 drive command is sent out. The imaging sensor 11 is exposed by the shutter unit 33 for a length of time corresponding to the shutter speed calculated on the basis of the light measurement output of the imaging sensor 11.

The body microcomputer 10 executes imaging processing and, when the imaging is completed, sends a command signal to the image recording controller 19. The image recorder 18 records an image signal to an internal memory and/or removable memory on the basis of the command of the image recording controller 19. The image recorder 18 records imaging mode information (whether auto-focus imaging mode or manual focus imaging mode) along with the image signal to the internal memory and/or removable memory on the basis of the command of the image recording controller 19.

Upon completion of the exposure, the imaging sensor drive controller 12 reads image data from the imaging sensor 11, and after specific image processing, image data is outputted via the body microcomputer 10 to the image display controller 21. Consequently, the captured image is displayed on the display unit 20.

Also, upon completion of the exposure, the shutter unit 33 is reset to its initial position by the body microcomputer 10. The body microcomputer 10 issues a command to the lens microcomputer 40 for the aperture drive controller 42 to reset the aperture unit 62 to its open position, and a reset command is sent from the lens microcomputer 40 to the various units. Upon completion of this resetting, the lens microcomputer 40 tells the body microcomputer 10 that resetting is complete. After the resetting completion information has been received from the lens microcomputer 40, and after a series of post-exposure processing has been completed, the body microcomputer 10 confirms that the shutter button 30 is not being pressed, and the imaging sequence is concluded.

(5) Moving Picture Capture

The digital camera 1 also has the function of capturing moving pictures. In moving picture imaging mode, image data is produced by the imaging sensor 11 at a specific period, and the image data thus produced is utilized to continuously carry out auto-focusing by contrast detection method. In moving picture imaging mode, if the shutter button 30 is pressed, or if the moving picture capture operation button 24 is pressed, a moving picture is recorded to the image recorder 18, and when the shutter button 30 or the moving picture capture operation button 24 is pressed again, recording of the moving picture by the image recorder 18 is stopped.

Features of Digital Camera

The features of the digital camera 1 described above are as follows.

(1) With this digital camera 1, since the focus lens unit 75 is driven in the optical axis direction with respect to the second lens group unit 77 by just the focus motor 64, in a state in which no power is supplied to the focus motor 64, the focus lens unit 75 does not move in the optical axis direction with respect to the second lens group unit 77. Accordingly, if the user operates the zoom ring 84 in a state in which no power is supplied to the focus motor 64, the focus lens unit 75 is driven in the optical axis direction integrally with the second lens group unit 77, rather than moving relative to the second lens group unit 77. Here, since a gap is at all times ensured between the focus lens unit 75 and the fourth lens group unit 78, even in a state in which no power is supplied to the focus motor 64, the focus lens unit 75 is prevented from coming into contact with the fourth lens group unit 78. More precisely, the third lens group support frame 56 is prevented from coming into contact with the first support frame 57. Consequently, damage to the members can be prevented with this interchangeable lens unit 2.

In particular, since the positions of the various components are determined so as to satisfy the above-mentioned Formula 1, when the zoom ring 84 is operated in a state of greatest distance in the optical axis direction between the focus lens unit 75 and the second lens group unit 77, a gap is ensured between the third lens group support frame 56 and the first support frame 57. This effectively prevents contact between the members.

(2) With this digital camera 1, since the focus lens unit 75 is driven with respect to the second lens group unit 77 by the focus motor 64 alone, there is no need for a structure that moves the focus lens unit 75 with respect to the second lens group unit 77. Accordingly, the structure for driving the focus lens unit 75 can be simplified, and the focus lens unit 75 can be made more compact and lightweight.

Furthermore, since the focus motor 64 is a stepping motor, the drive speed of the focus lens unit 75 is relative fast. Also, since the movement of the focus lens unit 75 and the reverse operation of the focus lens unit 75 can be carried out smoothly and quickly, the wobbling (vibration of micro-amplitude) operation necessary during moving picture capture can be carried out smoothly and quickly, so high-precision focusing is possible not only during still picture imaging, but also during moving picture imaging.

Thus, high-speed focusing can be performed with this digital camera 1.

(3) With this digital camera 1, since the rotary motion of the lead screw 64a is converted by the rack 66 and the lead screw 64a into linear motion of the focus lens unit 75 in the Z axis direction, backlash can be kept relatively low. Consequently, the precision of focusing can be enhanced.

(4) With this digital camera 1, since the focus lens unit 75 and the focus motor 64 move in the Z axis direction integrally with the second lens group unit 77, even if the user turns the zoom ring 84 quickly, the focus lens unit 75 can still be moved integrally with the second lens group unit 77. Therefore, if the subject distance is to be kept substantially constant before and after the zooming operation, the focus motor 64 may move the third lens group G3 by a distance obtained by subtracting the distance that the second lens group G2 is moved by the cam mechanism with respect to the imaging sensor 11 from the distance that the third lens group G3 is to be moved with respect to the imaging sensor 11. This makes it easy to keep up with fast operation of the zoom ring 84 by the user.

Second Embodiment

In the first embodiment above, damage to the members was prevented by determining the layout of the optical system L so as to satisfy Formula 1, but a constitution is also possible in which the focus lens unit 75 is driven by the focus motor 64 to a position where it does not come into contact with the fourth lens group unit 78.

In the following embodiments, components with substantially the same function as in the first embodiment are numbered the same, and these components will not be described in detail again.

Figure 17:
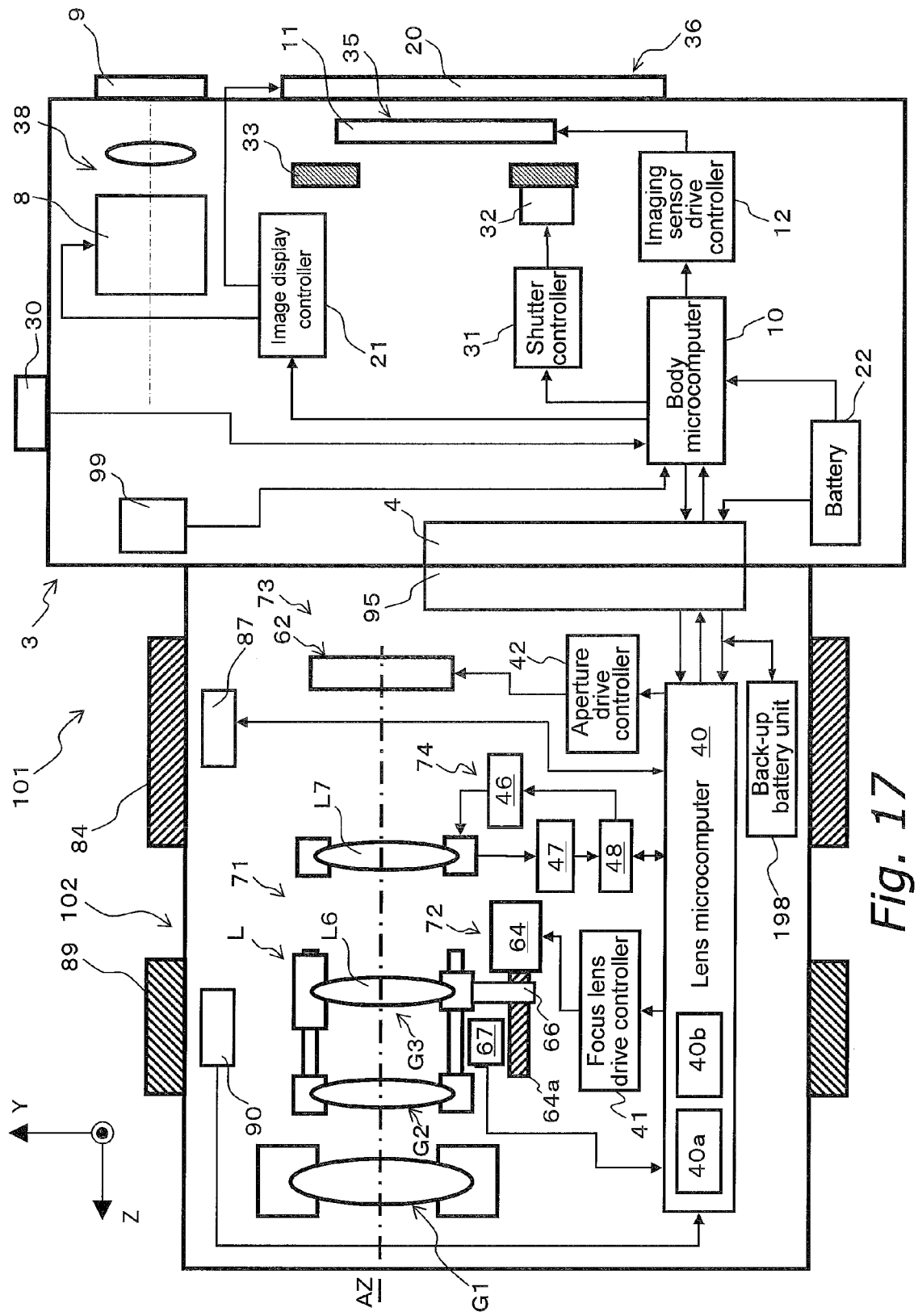
FIG. 17 is a simplified diagram of the configuration of a digital camera (second embodiment)

With the camera system 101 shown in FIG. 17, an interchangeable lens unit 102 has a back-up battery unit 198. The back-up battery unit 198 can supply power to the various components of the interchangeable lens unit 102, and also has the function of detecting that the supply of power from the battery 22 of the camera body 3 has stopped. The back-up battery unit 198 can supply power to the focus motor 64 when the supply of power from the battery 22 to the focus motor 64 has stopped.

Possible causes of the stoppage of power supply from the camera body 3 are that the power switch 25 is off, the interchangeable lens unit 102 has been removed from the camera body 3, the battery 22 is almost dead, and so forth.

Figure 18:
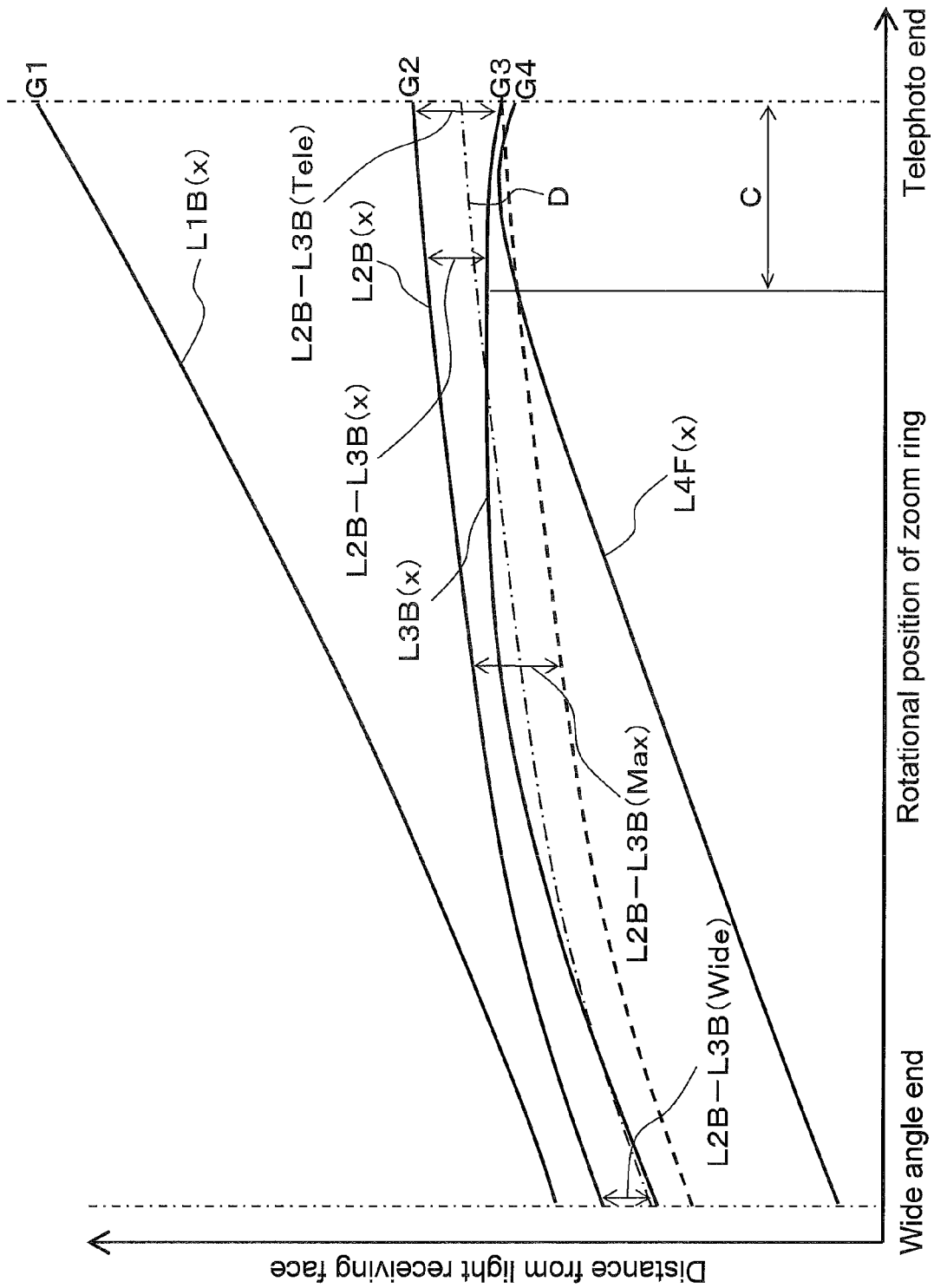
FIG. 18 is a graph of the relationship between the rotational angle of a zoom ring and the distance of the various members from an imaging sensor (second embodiment)

As shown in FIG. 18, unlike with the digital camera 1 discussed above, the layout of the optical system L in the camera system 101 does not satisfy the conditions of Formula 1. Accordingly, when the user operates the zoom ring 84 in a state in which no power is supplied to the focus motor 64, there is the risk that the focus lens unit 75 will come into contact with the fourth lens group unit 78 within a contact range C.

Figure 19:
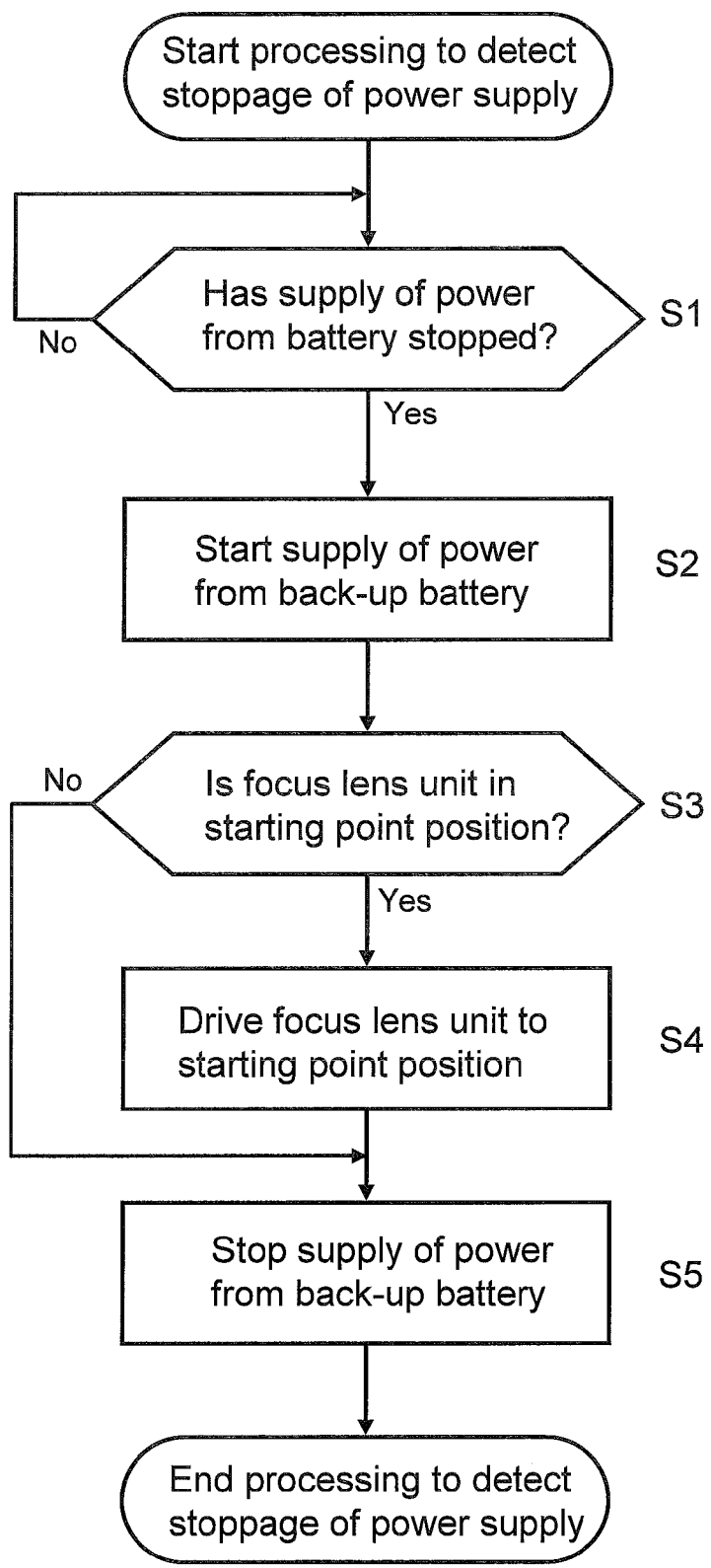
FIG. 19 is a flowchart of processing for detecting that power supply has been halted (second embodiment)

However, with this camera system 101, damage to the members can be prevented because the power supply stoppage detection processing shown in FIG. 19 is executed by the interchangeable lens unit 102.

More specifically, as shown in FIG. 19, the back-up battery unit 198 monitors whether or not the supply of power from the battery 22 has stopped (S1). If the power supply has stopped, the back-up battery unit 198 takes over for the battery 22 and temporarily supplies power to the components of the interchangeable lens unit 102 (S2). Next, the lens microcomputer 40 confirms whether or not the focus lens unit 75 has stopped at the starting point position D (S3). Whether or not the focus lens unit 75 has stopped at the starting point position D can be determined by whether or not the protrusion 56d of the third lens group support frame 56 has been detected.

As shown in FIG. 18, at the starting point position D a gap is at all times ensured in the Z axis direction between the focus lens unit 75 and the fourth lens group unit 78, so the starting point position D can be considered the position where there is no contact between the focus lens unit 75 and the fourth lens group unit 78. If the focus lens unit 75 has not stopped at the starting point position D, the lens microcomputer 40 sends a drive command to the focus drive controller 41. As a result, a drive signal is sent from the focus drive controller 41 to the focus motor 64, and the focus lens unit 75 is driven by the focus motor 64 to the starting point position D. Here, since the current position of the focus lens unit 75 can be ascertained on the basis of the count value of the counter 40b, the lens microcomputer 40 can also ascertain the direction in which the focus lens unit 75 is to be driven. Upon completion of the drive of the focus lens unit 75, the supply of power from the back-up battery unit 198 is stopped (S5).

On the other hand, if the focus lens unit 75 is disposed at the starting point position D, there is no need to drive the focus lens unit 75, so after step S3, the supply of power from the back-up battery unit 198 is stopped (S5).

In this case, even if the focus lens unit 75 has stopped at a position where it would come into contact with the fourth lens group unit 78, the focus lens unit 75 will be driven to a position where it does not come into contact with the fourth lens group unit 78, in a state in which the supply of power is ensured by the back-up battery unit 198. Accordingly, damage to the members can be prevented with this camera system 101.

Also, the starting point position D is disposed near the middle of the movement range of the focus lens unit 75 in the infinity tracking table 100. In this case, since the focus lens unit 75 is disposed at the starting point position D at the point when the tracking operation is recommenced, the focus lens unit 75 can be moved to any position in a relatively short time.

Unlike with the first embodiment discussed above, since there is no need to satisfy Formula 1 here, the fourth lens group G4 can be disposed closer to the third lens group G3, allowing the optical system L to be more compact. Also, if there is no need to make the optical system L more compact, there will be greater latitude in the optical design.

Third Embodiment

In the second embodiment above, the focus lens unit 75 was retracted after the supply of power from the main power supply was actually stopped, but the focus lens unit 75 may instead be retracted ahead of time in anticipation of the power supply being stopped.

Figure 20:
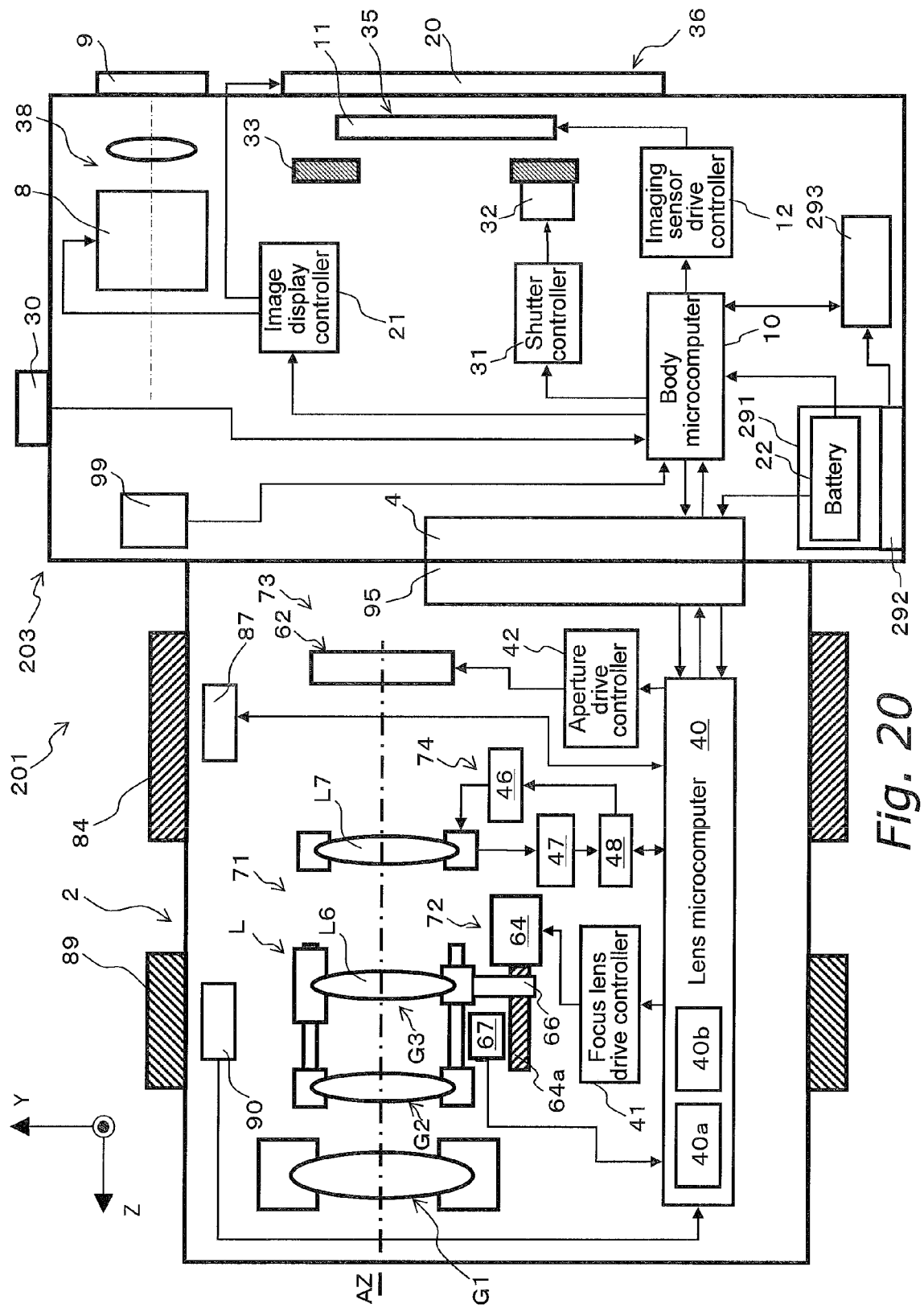
FIG. 20 is a simplified diagram of the configuration of a digital camera (third embodiment)

For example, with the digital camera 201 shown in FIG. 20, a camera body 203 has a holder 291 for holding the battery 22, a battery cover 292 (an example of the cover member), and a cover detecting sensor 293 (an example of the auxiliary operation detector). Unlike in the second embodiment discussed above, the interchangeable lens unit 2 does not have a back-up battery unit 198.

The battery cover 292 is openably provided to the holder 291. The cover detecting sensor 293 is a sensor for detecting whether the battery cover 292 is open or closed, and sends its detection signal to the body microcomputer 10. Since the holder 291 has a locking mechanism (not shown) for supporting the battery 22, the battery 22 will not fall out of the holder 291 even if the battery cover 292 is open. If the user releases the locking mechanism while the battery cover 292 is open, the battery 22 can be removed from the holder 291. That is, when the battery cover 292 is open, it is possible for the user to remove the battery 22.

Figure 21:
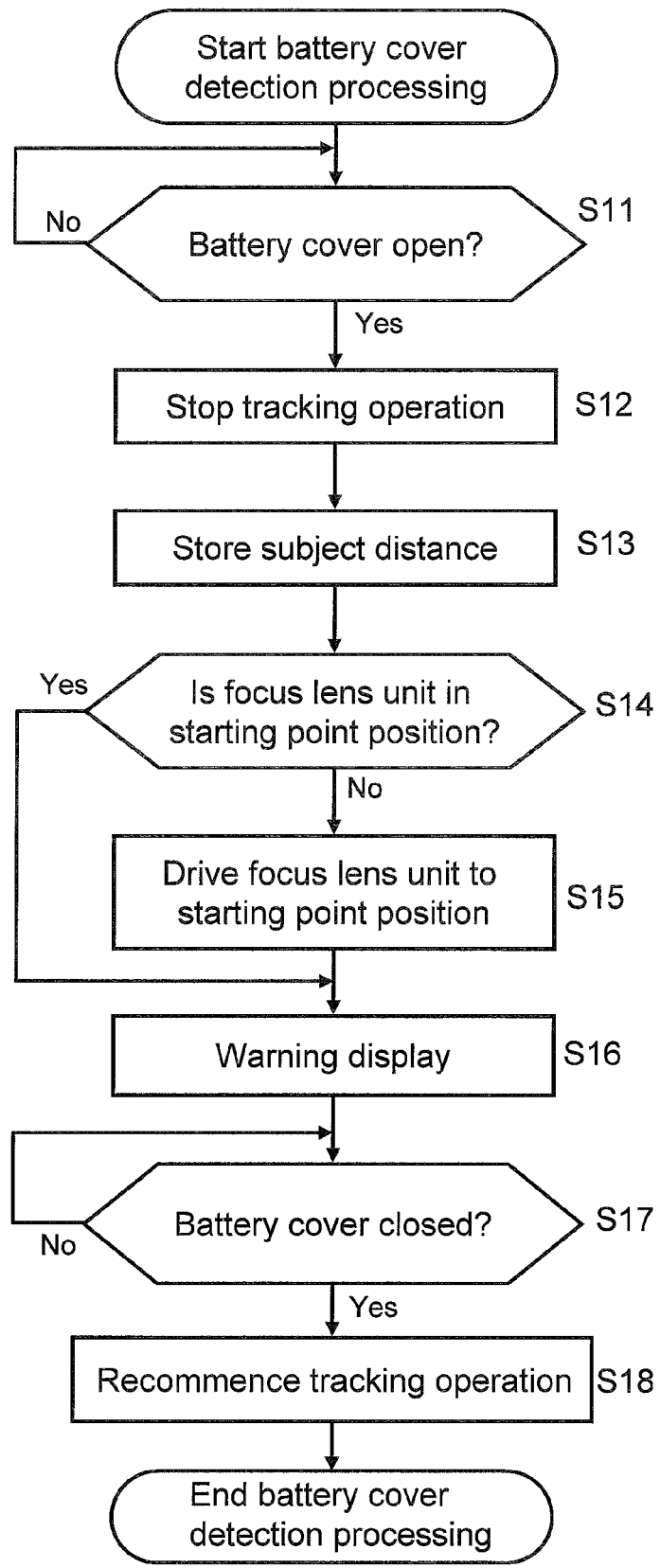
FIG. 21 is a flowchart of processing for detecting the battery cover (third embodiment)

For example, as shown in FIG. 21, the body microcomputer 10 monitors whether the battery cover 292 is open or closed (S11). More specifically, when the battery cover 292 is opened, the cover detecting sensor 293 detects that the battery cover 292 has been opened and sends a detection signal to the body microcomputer 10. On the basis of this signal, the body microcomputer 10 is able to ascertain that the battery cover 292 is open.

When the battery cover 292 has been opened, the user is able to remove the battery 22, so the tracking operation by the focus adjusting unit 72 is halted (S12). More precisely, the body microcomputer 10 sends the lens microcomputer 40 a command to stop electronic tracking. The lens microcomputer 40 stops its electronic tracking operation on the basis of this stop command. The phrase "the tracking operation stops" means that the focus motor 64 is not driven even if the zoom ring 84 or the focus ring 89 is operated.

After the tracking operation has stopped, the current subject distance is stored in the memory 40a (S13). In other words, which tracking table 100 is the currently selected tracking table is stored in the memory 40a (S13).

After the subject distance has been stored, the body microcomputer 10 checks whether or not the focus lens unit 75 is disposed at the starting point position D (S14). More precisely, the body microcomputer 10 determines whether or not the photosensor 67 has detected the protrusion 56d of the focus lens unit 75. If the focus lens unit 75 is not disposed at the starting point position D, then the focus motor 64 drives the focus lens unit 75 to the starting point position D (S15). More specifically, the lens microcomputer 40 decides on the basis of the current position of the focus lens unit 75 in which direction the focus lens unit 75 needs to be driven, and sends the focus drive controller 41 a command to drive the focus motor 64. On the basis of this drive command, the focus drive controller 41 produces a drive signal for the focus motor 64, and the focus motor 64 is driven by this drive signal. If the protrusion 56d of the photosensor 67 is detected, the drive of the focus lens unit 75 by the focus motor 64 is halted. If the focus lens unit 75 is disposed at the starting point position D, the processing moves on to step S16.

After the focus lens unit 75 has been retracted, a warning such as "Battery lid is open" is displayed on the display unit 20 (S16). The display of this warning makes it easy for the user to be aware that the battery cover 292 is open, and makes it easy for the user to find out the reason for the stoppage of the electronic tracking with the focus adjusting unit 72.

After the warning display, the body microcomputer 10 checks the state of the battery cover 292 (S17). If the battery cover 292 is open, the monitoring of the state of the battery cover 292 is continued. When the user closes the battery cover 292, the cover detecting sensor 293 detects that the battery cover 292 has been closed. The body microcomputer 10 decides on the basis of this detection result that the battery cover 292 is closed, and the tracking operation with the focus adjusting unit 72 is recommenced (S18). More specifically, the rotational position of the zoom ring 84 is detected by the linear position sensor 87, and the focus lens unit 75 is driven by the focus motor 64 to the position corresponding to the rotational position of the zoom ring 84. The tracking table 100 used at this point is the tracking table 100 corresponding to the subject distance stored in step S13.

In this case, it is anticipated that the battery 22 will be removed when the battery cover 292 is opened, and before the battery 22 is removed the focus lens unit 75 is automatically driven to the starting point position D where it will not come into contact with the fourth lens group unit 78. Accordingly, even if the user turns the zoom ring 84 in a state in which the battery 22 has been removed, the focus lens unit 75 will not come into contact with the fourth lens group unit 78.

Also, the starting point position D is disposed near the middle of the movement range of the focus lens unit 75 in the infinity tracking table 100. In this case, since the focus lens unit 75 is disposed at the starting point position D at the point when the tracking operation is recommenced, the focus lens unit 75 can be moved to any position in a relatively short time.

Just as with the second embodiment above, since there is no need to satisfy Formula 1 here, the fourth lens group G4 can be disposed closer to the third lens group G3, allowing the optical system L to be more compact. Also, if there is no need to make the optical system L more compact, there will be greater latitude in the optical design.

Fourth Embodiment

A configuration is also possible in which the focus lens unit 75 is retracted in the event that electronic tracking with the focus adjusting unit 72 should be switched to an unnecessary mode such as sleep mode or reproduction mode. The sleep mode and reproduction mode are examples of idle modes in which there is no need for the interchangeable lens unit to operate.

Figure 22:
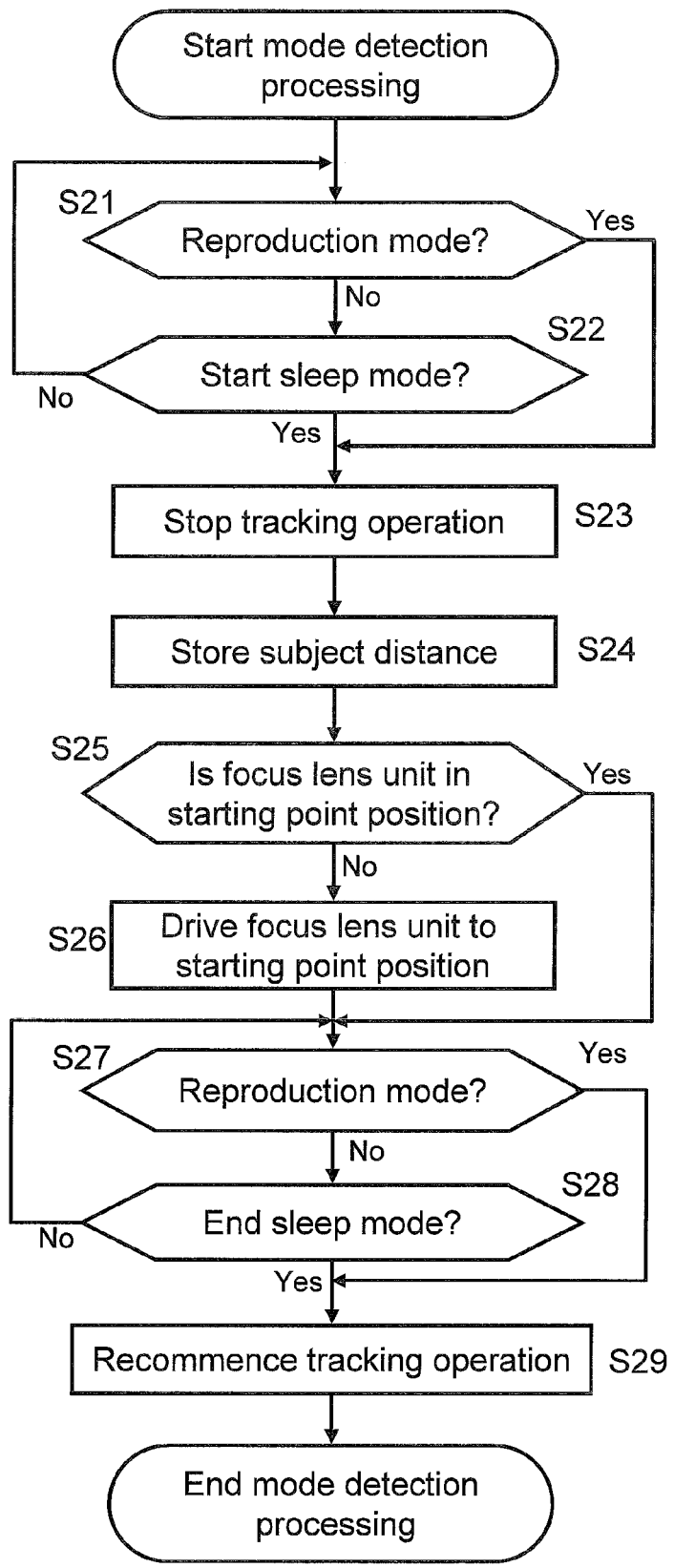
FIG. 22 is a flowchart of processing for mode detection (fourth embodiment)

For example, as shown in FIG. 22, the body microcomputer 10 determines whether or not the operating mode is the reproduction mode (S21). If the operating mode is not the reproduction mode, the body microcomputer 10 determines whether or not the mode has changed to the sleep mode (S22). The sleep mode is a mode in which the operation of the digital camera 1 is temporarily stopped when a state of no operational input has continued for a specific length of time in the mode for capturing moving or still pictures. If the mode has not changed to sleep mode, the monitoring of the reproduction mode and sleep mode is continued by the body microcomputer 10 (S21, S22).

On the other hand, if the system is in the reproduction mode or sleep mode, then the tracking operation with the focus adjusting unit 72 is stopped just as in the third embodiment (S23). After the tracking operation has stopped, the current subject distance is stored in the memory 40a (S24) just as in the third embodiment above.

After the subject distance has been stored, the body microcomputer 10 checks whether or not the focus lens unit 75 is disposed at the starting point position D (S25). More precisely, the body microcomputer 10 determines whether or not the photosensor 67 has detected the protrusion 56d of the focus lens unit 75. If the focus lens unit 75 is not disposed at the starting point position D, then the focus motor 64 drives the focus lens unit 75 to the starting point position D (S26). More specifically, the lens microcomputer 40 decides on the basis of the current position of the focus lens unit 75 in which direction the focus lens unit 75 needs to be driven, and sends the focus drive controller 41 a command to drive the focus motor 64. On the basis of this drive command, the focus drive controller 41 produces a drive signal for the focus motor 64, and the focus motor 64 is driven by this drive signal. If the protrusion 56d of the photosensor 67 is detected, the drive of the focus lens unit 75 by the focus motor 64 is halted. If the focus lens unit 75 is disposed at the starting point position D, the processing moves on to step S37.

After the focus lens unit 75 has been retracted, the body microcomputer 10 determines whether the operating mode is the reproduction mode or the sleep mode (S27, S28). If it is the reproduction mode or sleep mode, monitoring of the mode is continued. On the other hand, if it is neither the reproduction mode nor the sleep mode, it is anticipated that the user will be capturing an image, so the tracking operation with the focus adjusting unit 72 is recommenced (S29). At this point, electronic tracking is carried out on the basis of the tracking table corresponding to the stored subject distance.

In this case, when the state of the digital camera 1 is switched to the reproduction mode or sleep mode, the focus lens unit 75 is automatically driven to the starting point position D where it will not come into contact with the fourth lens group unit 78. Accordingly, even if the zoom ring 84 of the interchangeable lens unit 2 is operated in a state in which the interchangeable lens unit 2 has been removed from the camera body 3, the focus lens unit 75 will not come into contact with the fourth lens group unit 78.

Also, since there is no need to use the interchangeable lens unit 2 in reproduction mode, the focus lens unit 75 is not driven even if the zoom ring 84 or the focus ring 89 is accidentally operated in this mode. Accordingly, wasted power consumption can be reduced.

Furthermore, the starting point position D is disposed near the middle of the movement range of the focus lens unit 75 in the infinity tracking table 100. In this case, since the focus lens unit 75 is disposed at the starting point position D at the point when the tracking operation is recommenced, the focus lens unit 75 can be moved to any position in a relatively short time.

The stopping of the tracking operation in sleep mode can also be accomplished by stopping the supply of power to the entire interchangeable lens unit 2. Also, in sleep mode, the digital camera 1 may be put in an operable state, so that the sleep mode will be released if anything is operated.

Just as with the second embodiment above, since there is no need to satisfy Formula 1 here, the fourth lens group G4 can be disposed closer to the third lens group G3, allowing the optical system L to be more compact. Also, if there is no need to make the optical system L more compact, there will be greater latitude in the optical design.

Fifth Embodiment

The removal of the interchangeable lens unit 2 may also be anticipated on the basis of operation of the lens attachment button 99.

Figure 23:
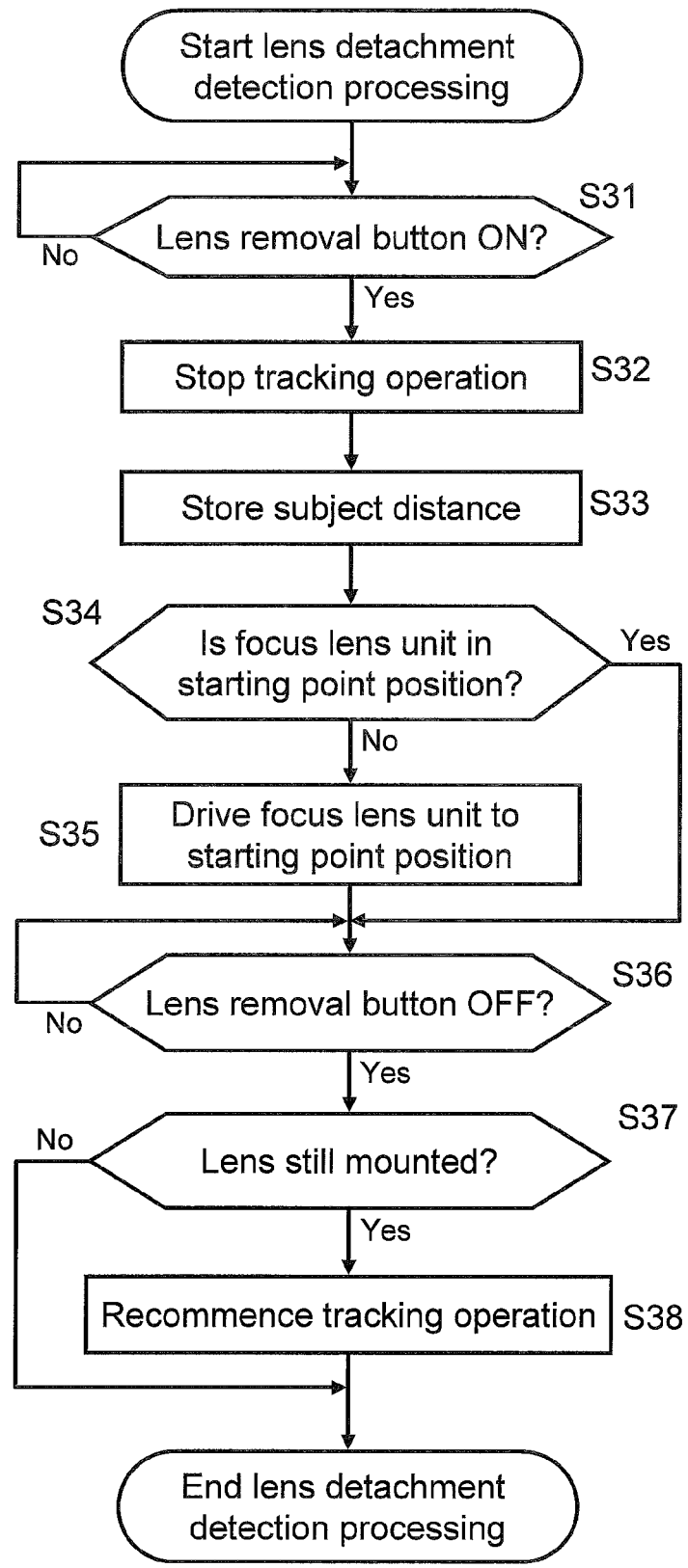
FIG. 23 is a flowchart of processing for detecting lens attachment (fifth embodiment).

For example, as shown in FIG. 23, the state of the lens attachment button 99 is monitored by the body microcomputer 10 (S31). When the lens attachment button 99 is pressed, since it is very likely that the interchangeable lens unit 2 will be removed from the camera body 3, the focus lens unit 75 is retracted prior to the removal of the interchangeable lens unit 2 and the stopping of the supply of power to the interchangeable lens unit 2. More specifically, the tracking operation with the focus adjusting unit 72 is stopped (S32), and the current subject distance is stored in the memory 40a (S33).

After the subject distance has been stored, the body microcomputer 10 checks whether or not the focus lens unit 75 is disposed at the starting point position D (S34). More precisely, the body microcomputer 10 determines whether or not the protrusion 56d of the photosensor 67 has been detected. If the focus lens unit 75 is not disposed at the starting point position D, the focus motor 64 drives the focus lens unit 75 to the starting point position D (S35). More specifically, the lens microcomputer 40 decides on the basis of the current position of the focus lens unit 75 in which direction the focus lens unit 75 needs to be driven, and sends the focus drive controller 41 a command to drive the focus motor 64. On the basis of this drive command, the focus drive controller 41 produces a drive signal for the focus motor 64, and the focus motor 64 is driven by this drive signal. If the protrusion 56d of the photosensor 67 is detected, the drive of the focus lens unit 75 by the focus motor 64 is halted. If the focus lens unit 75 is disposed at the starting point position D, the processing moves on to step S36.

After the focus lens unit 75 has been retracted, the state of the lens attachment button 99 is monitored by the body microcomputer 10 (S36). If the lens attachment button 99 has not been pressed, the body microcomputer 10 determines whether or not the interchangeable lens unit 2 has been removed (S37). If the interchangeable lens unit 2 has been removed, any communication between the body microcomputer 10 and the lens microcomputer 40 via the lens-side contact 91 is cut off, for example. That is, the body microcomputer 10 ascertains whether or not the interchangeable lens unit 2 has been mounted. If the mounting of the interchangeable lens unit 2 is still in progress, it is conceivable that the user has merely pressed the lens attachment button 99, so the tracking operation is recommenced (S38).

If it is determined in step S37 that the interchangeable lens unit 2 has been removed, then the lens removal detection processing is ended.

In this case, it is anticipated that the interchangeable lens unit 2 will be removed from the camera body 3 on the basis of the operation of the lens attachment button 99, and the focus lens unit 75 can be retracted to a position where it does not come into contact with the fourth lens group unit 78, before the supply of power to the interchangeable lens unit 2 is stopped.

Also, the starting point position D is disposed near the middle of the movement range of the focus lens unit 75 in the infinity tracking table 100. Since the focus lens unit 75 is disposed at the starting point position D at the point when the tracking operation is recommenced, the focus lens unit 75 can be moved to any position in a relatively short time.

Just as with the second embodiment above, since there is no need to satisfy Formula 1 here, the fourth lens group G4 can be disposed closer to the third lens group G3, allowing the optical system L to be more compact. Also, if there is no need to make the optical system L more compact, there will be greater latitude in the optical design.

Other Embodiments

Embodiments are not limited to those discussed above, and various changes and modifications are possible without departing from the gist of the present invention. Also, the above embodiments are basically just favorable examples, and are not intended to limit the present invention, its applications, or the scope of these applications.

(1) In the above embodiments, the digital camera was capable of capturing both moving and still pictures, but may instead be capable of capturing just still pictures, or just moving pictures.

(2) In the first to fourth embodiments above, the digital camera may be, for example, a digital still camera, a digital video camera, a mobile telephone equipped with a camera, or a PDA equipped with a camera.

In the fifth embodiment above, the digital camera may be an interchangeable lens type.

(3) The above-mentioned digital camera 1 did not have a quick return mirror, but may have a quick return mirror as do conventional single reflex lens cameras.

(4) The configuration of the optical system L is not limited to that in the embodiments. For example, the third lens group G3 may consist of a plurality of lenses, and the second lens group G2 may consist of just a single lens.

Also, the layout of the optical system L is not limited to that shown in FIG. 13. For example, the distance L2B–L3B(x) may be greatest on the wide angle end side, and the position A1 of the shortest distance between the second lens group unit 77 and the focus lens unit 75 may be near the wide angle end, rather than near the telephoto end.

(5) In the first embodiment above, the third lens group support frame 56 of the focus lens unit 75 and the first support frame 57 of the fourth lens group unit 78 were closest together, but the configuration may instead be such that the third lens group G3 (the sixth lens L6) and the seventh lens L7 of the fourth lens group G4 are closest together. In this case, the distances L3B(x) and L4F(x) are determined using the surfaces of the sixth lens L6 and the seventh lens L7 as a reference.

(6) In the above embodiments, the exposure time to the imaging sensor 11 was controlled by operating the shutter unit 33, but the exposure time of the imaging sensor 11 may instead be controlled by an electronic shutter.

(7) In the above embodiments, electronic tracking was performed by the lens microcomputer 40, but a command may be sent from the body microcomputer 10 to the lens microcomputer 40, and the control of the electronic tracking performed on the basis of this command.

(8) The third to fifth embodiments above were given as separate embodiments, but the constitutions of these embodiments may also be combined.

(9) In the second to fifth embodiments above, the focus lens unit 75 was driven to the starting point position D (an example of a predetermined position) in the retraction of the focus lens unit 75, but the position to which it is retracted does not have to be the starting point position D, and it may be any position as long as it is a position where the focus lens unit 75 does not come into contact with the fourth lens group unit 78.

Also, whether or not the focus lens unit 75 was to be driven was determined on the basis of the detection result from the photosensor 67, but whether or not the focus lens unit 75 needs to be driven may be determined on the basis of other information, such as the count value of the counter 40b.

Furthermore, whether or not the focus lens unit 75 needs to be driven may be determined on the basis of whether or not the focus lens unit 75 is disposed within a specific predetermined range.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A lens barrel for forming an optical image of a subject on an imaging element, comprising:
  a first lens unit having a first lens element and a first lens support frame supporting the first lens element;
  a second lens unit having a second lens element arranged to vary the focal length by moving relative to the first lens element in the optical axis direction, and a second lens support frame supporting the second lens element;
  a focus lens unit having a focus lens arranged to vary the focal state of the optical image by moving relative to the first lens element or the second lens element in the optical axis direction, and a focus lens support frame supporting the focus lens;

a zoom mechanism arranged to relatively move the first lens unit and the second lens unit in the optical axis direction, having a zoom operating unit configured to be operated by the user, with which the operating force inputted to the zoom operating unit is mechanically transmitted to at least one of the first lens unit and the second lens unit; and a focus actuator supported by the zoom mechanism to move integrally with the first lens unit, and configured to utilize electric power to drive the focus lens unit in the optical axis direction with respect to the first lens unit, wherein the focus lens unit is arranged to be driven in the optical axis direction with respect to the first lens unit by just the focus actuator, and when the zoom operating unit is operated in a state in which no power is being supplied to the focus actuator, a gap is always maintained in the optical axis direction between the focus lens unit and the second lens unit.

2. The lens barrel according to claim 1, wherein when the zoom operating unit is operated in a state in which the distance in the optical axis direction between the first lens unit and the focus lens unit is the greatest, a gap is always maintained between the focus lens unit and the second lens unit.

3. The lens barrel according to claim 1, wherein if we let L2B be the distance from the imaging element to the face of the first lens unit on the imaging element side, L4B be the distance from the imaging element to the face of the second lens unit on the first lens unit side, and Lmax be the maximum distance between the face of the focus lens unit on the second lens unit side and the face of the first lens unit on the imaging element side, the inequality L2B−Lmax>L4B is satisfied.

4. The lens barrel according to claim 1, wherein the focus lens is disposed in the optical axis direction between the first lens element and the second lens element.

5. The lens barrel according to claim 1, wherein the focus actuator is a stepping motor.

6. An imaging device, comprising:

the lens barrel according to claim 1; and a camera body having the imaging element.

7. A lens barrel for forming an optical image of a subject on an imaging element, with which power can be supplied from a main power supply, said lens barrel comprising:

a first lens unit having a first lens element and a first lens support frame supporting the first lens element;

a second lens unit having a second lens element arranged to vary the focal length by moving relative to the first lens element in the optical axis direction, and a second lens support frame supporting the second lens element;

a focus lens unit having a focus lens arranged to vary the focal state of the optical image by moving relative to the first lens element or the second lens element in the optical axis direction, and a focus lens support frame supporting the focus lens;

a zoom mechanism arranged to relatively move the first lens unit and the second lens unit in the optical axis direction, having a zoom operating unit that is operated by the user, with which the operating force inputted to the zoom operating unit is mechanically transmitted to at least one of the first lens unit and the second lens unit;

a focus actuator supported by the zoom mechanism to move integrally with the first lens unit, and configured to utilize electric power to drive the focus lens unit in the optical axis direction with respect to the first lens unit; and an auxiliary power supply that can supply power to the focus actuator if the supply of power from the main power supply to the focus actuator should be halted.

8. The lens barrel according to claim 7, further comprising:

a drive controller that controls the focus actuator so that, when power is being supplied from the auxiliary power supply to the focus actuator, the focus lens unit moves to a retracted position where the focus lens unit does not come into contact with the second lens unit.

9. The lens barrel according to claim 8, wherein the retracted position is a position where the focus lens unit does not come into contact with the second lens unit when the zoom operating unit is operated in a state in which the supply of power to the focus actuator has been halted.

10. The lens barrel according to claim 9, further comprising:

a position sensor that detects the position of the focus lens unit with respect to the first lens unit, and the drive controller determines whether or not to move the focus lens unit to the retracted position on the basis of the detection result of the position sensor.

11. The lens barrel according to claim 10, wherein when power is being supplied from the auxiliary power supply to the focus actuator, and the focus lens unit is not disposed in a predetermined position or range, the focus actuator is controlled so that the focus lens unit moves to the predetermined position or range.

12. The lens barrel according to claim 10, wherein the position of the focus lens unit that can be detected by the position sensor is a position where the focus lens unit will not come into contact with the second lens unit if the zoom operating unit is operated in a state in which the supply of power to the focus actuator has been halted.

13. An imaging device, comprising:

the lens barrel according to claim 7; and a camera body having the main power supply.

14. An imaging device for acquiring an image of a subject, comprising:

a first lens unit having a first lens element and a first lens support frame supporting the first lens element;

a second lens unit having a second lens element arranged to vary the focal length by moving relative to the first lens element in the optical axis direction, and a second lens support frame supporting the second lens element;

a focus lens unit having a focus lens arranged to vary the focal state of the optical image by moving relative to the first lens element or the second lens element in the optical axis direction, and a focus lens support frame supporting the focus lens;

a zoom mechanism arranged to relatively move the first lens unit and the second lens unit in the optical axis direction, having a zoom operating unit that is operated by the user, with which the operating force inputted to the zoom operating unit is mechanically transmitted to at least one of the first lens unit and the second lens unit;

a focus actuator supported by the zoom mechanism to move integrally with the first lens unit, and configured to utilize electric power to drive the focus lens unit in the optical axis direction with respect to the first lens unit;

an auxiliary operation detector that detects auxiliary operation in which the halt of power supply to the focus actuator can be expected; and a drive controller that controls the focus actuator so that the focus lens unit moves to a retracted position where the focus lens unit does not come into contact with the second lens unit, on the basis of the detection result of the auxiliary operation detector.

15. The imaging device according to claim 14, wherein the retracted position is a position where the focus lens unit does not come into contact with the second lens unit when the zoom operating unit is operated in a state in which the supply of power to the focus actuator has been halted.

16. The imaging device according to claim 14, further comprising:
a position sensor configured to detect the position of the focus lens unit with respect to the first lens unit,
wherein the drive controller is configured to determine whether or not to move the focus lens unit to the retracted position on the basis of the detection result of the position sensor.

17. The imaging device according to claim 16, wherein when the auxiliary operation detector has detected the auxiliary operation, and the focus lens unit is not disposed in a predetermined position or range, the drive controller controls the focus actuator so that the focus lens unit moves to the predetermined position or range.

18. The imaging device according to claim 16, wherein the position of the focus lens unit that can be detected by the position sensor is a position where the focus lens unit will not come into contact with the second lens unit if the zoom operating unit is operated in a state in which the supply of power to the focus actuator has been halted.

19. The imaging device according to claim 14, further comprising:
a holder capable of holding a battery; and
a cover member that is openably attached to the holder,
wherein the auxiliary operation detector can detect whether the cover member is open or closed, and
the drive controller controls the focus actuator so that the focus lens unit moves to the retracted position when the auxiliary operation detector has detected that the cover member is open.

20. The imaging device according to claim 14, wherein the auxiliary operation detector is able to detect that the imaging device is in an idle mode in which there is no need for the focus actuator to operate, and
the drive controller controls the focus actuator so that the focus lens unit moves to the retracted position when it is determined by the auxiliary operation detector that the imaging device has entered the idle mode.

21. The imaging device according to claim 14, wherein the first lens unit, the second lens unit, the focus lens unit, the zoom mechanism, and the focus actuator are included in an interchangeable lens unit,
the auxiliary operation detector and the drive controller are included in a camera body to which the interchangeable lens unit can be mounted,
the camera body has a lens attachment operating unit configured to attach and remove the interchangeable lens unit,
the auxiliary operation detector is able to detect that the lens attachment operating unit has been operated, and
the drive controller is configured to control the focus actuator so that the focus lens unit moves to the retracted position when the auxiliary operation detector has detected that the lens attachment operating unit has been operated.

* * * * *